US012570561B2

(12) United States Patent
Gazzelli et al.

(10) Patent No.: US 12,570,561 B2
(45) Date of Patent: Mar. 10, 2026

(54) DEVICE FOR DISTRIBUTING MINERALIZED WATER AND ASSOCIATED METHOD

(71) Applicant: 77 VISION WAY LTD, Belfast (IE)

(72) Inventors: Mauro Gazzelli, Lugano-Aldesago (CH); Alberto Cozzi, Lugano (CH)

( * ) Notice: Subject to any disclaimer, the term of this patent is extended or adjusted under 35 U.S.C. 154(b) by 551 days.

(21) Appl. No.: 17/639,227

(22) PCT Filed: Aug. 30, 2019

(86) PCT No.: PCT/EP2019/073278
§ 371 (c)(1),
(2) Date: Feb. 28, 2022

(87) PCT Pub. No.: WO2021/037385
PCT Pub. Date: Mar. 4, 2021

(65) Prior Publication Data
US 2022/0298047 A1 Sep. 22, 2022

(51) Int. Cl.
*C02F 9/20* (2023.01)
*B01D 1/00* (2006.01)
(Continued)

(52) U.S. Cl.
CPC .............. *C02F 9/20* (2023.01); *B01D 1/0023* (2013.01); *B01D 1/0082* (2013.01); *B01D 3/106* (2013.01);
(Continued)

(58) Field of Classification Search
CPC .. A47J 31/40; C02F 1/686; C02F 1/74; C02F 2201/006; B01D 3/00; B01D 3/001;
(Continued)

(56) References Cited

U.S. PATENT DOCUMENTS 3,268,441 A * 8/1966 Lindstrom .............. C02F 1/469
210/640
4,696,718 A 9/1987 Lasater
(Continued)

FOREIGN PATENT DOCUMENTS

CN 1980589 A 6/2007
CN 206391214 U 8/2017
(Continued)

OTHER PUBLICATIONS

Japan Patent Office, Decision of Refusal for Japanese Patent Application No. 2022-513640, Oct. 25, 2023, Japan Patent Office, 3-4-3 Kasumigaseki, Chiyoda-ku Tokyo 100-8915, Japan.
(Continued)

*Primary Examiner* — Allison G Fitzsimmons
(74) *Attorney, Agent, or Firm* — UNDERWOOD & ASSOCIATES, LLC

(57) ABSTRACT

A device (1) for distributing mineralized water, said device comprising:
an inlet (3), for loading water from an external source (100);
a distillation unit (2), connected to the inlet (3) and configured to provide a distillation of an amount of water at least partially through heating, wherein said distillation unit (2) in turn comprises, or is operatively connected to, at least an heater (4) configured for providing heat in an amount sufficient to heat the amount of water at least up to a boiling temperature;
a water distributor (5) configured for transferring a predetermined amount of distilled water (D) extracted from the distillation unit (2), to a removable container (10), the water distributor (5) being provided with an outlet nozzle or aperture (6) configured to face in use on said container (10);
(Continued)

a mineralization unit (7) interposed between the distillation unit (2) and the outlet nozzle or aperture (6), said mineralization unit (7) being configured for accessing the inner cavity of a disposable capsule (20), containing a mineralized fluid solution or powder (M) in said cavity, for extracting at least part of said mineralized fluid solution or powder (M) from the capsule (20) and/or being configured for emptying the capsule (20) from the mineralized fluid solution or powder (M), and transferring at least part of the mineralized fluid solution or powder (M) from the capsule (20) to the water distributor (5);

the device, optionally through the water distributor (5), being configured to mix the mineralized fluid solution or powder (M) with the predetermined amount of distilled water (D) transferred by the water distributor (5) to the removable container (10).

10 Claims, 7 Drawing Sheets

(51) Int. Cl.

| | |
|---|---|
| *B01D 3/10* | (2006.01) |
| *B01D 5/00* | (2006.01) |
| *C02F 1/00* | (2023.01) |
| *C02F 1/04* | (2023.01) |
| *C02F 1/18* | (2023.01) |
| *C02F 1/32* | (2023.01) |
| *C02F 1/36* | (2023.01) |
| *C02F 1/50* | (2023.01) |
| *C02F 1/68* | (2023.01) |

(52) U.S. Cl.
CPC ........... *B01D 5/0042* (2013.01); *B01D 5/006* (2013.01); *C02F 1/006* (2013.01); *C02F 1/008* (2013.01); *C02F 1/042* (2013.01); *C02F 1/043* (2013.01); *C02F 1/18* (2013.01); *C02F 1/32* (2013.01); *C02F 1/36* (2013.01); *C02F 1/505* (2013.01); *C02F 1/686* (2013.01); *C02F 1/687* (2013.01); *C02F 2201/005* (2013.01); *C02F 2209/42* (2013.01); *C02F 2303/04* (2013.01); *C02F 2307/10* (2013.01)

(58) Field of Classification Search
CPC .......... B01D 3/005; B01D 3/004; B01D 3/06; B01D 3/12; B01D 3/14; B01D 3/38
See application file for complete search history.

(56) References Cited

U.S. PATENT DOCUMENTS

| | | | | |
|---|---|---|---|---|
| 4,770,748 | A | * | 9/1988 | Cellini ...................... B01D 1/30 |
| | | | | 202/205 |
| 6,932,889 | B1 | | 8/2005 | Holcomb |
| 2004/0097756 | A1 | | 5/2004 | Thiel |
| 2011/0174605 | A1 | | 7/2011 | Ugolin |
| 2013/0004637 | A1 | | 1/2013 | Gugerli |
| 2013/0112082 | A1 | | 5/2013 | Baldo |
| 2014/0326144 | A1 | | 11/2014 | Novak |
| 2015/0272373 | A1 | * | 10/2015 | Pirone ...................... A47J 31/40 |
| | | | | 99/287 |
| 2015/0275108 | A1 | * | 10/2015 | Gueh ......................... C10J 3/57 |
| | | | | 422/232 |
| 2018/0311594 | A1 | | 11/2018 | Tsagkas |
| 2019/0375656 | A1 | * | 12/2019 | König .................. B01D 5/0015 |

FOREIGN PATENT DOCUMENTS

| | | | | | |
|---|---|---|---|---|---|
| EP | | 1095605 | B1 | * | 9/2004 .......... A47J 31/0668 |
| EP | | 3262994 | A1 | | 5/2019 |
| JP | | S61200889 | A | | 9/1986 |
| JP | | H5338629 | A | | 12/1993 |
| JP | | 2004121994 | A | | 4/2004 |
| JP | | 3131339 | U | | 5/2007 |
| JP | | 2009148751 | A | | 7/2009 |
| JP | | 2010036129 | A | | 2/2010 |
| JP | | 2010522081 | A | | 7/2010 |
| RU | | 1830385 | A1 | | 7/1993 |
| RU | | 2155302 | C1 | | 8/2000 |
| RU | | 94476 | U1 | | 5/2010 |
| WO | | 2008142663 | A2 | | 11/2008 |
| WO | | 20180141883 | A1 | | 8/2018 |

OTHER PUBLICATIONS

Japan Patent Office, English Translation of Decision of Refusal for Japanese Patent Application No. 2022-513640, Oct. 25, 2023, Japan Patent Office, 3-4-3 Kasumigaseki, Chiyoda-ku Tokyo 100-8915, Japan.

European Patent Office, International Search Report for PCT/2019/073278, May 19, 2020, P.B. 5818 Patentlaan 2, NL—2280 HV Rijswijk.

European Patent Office, Written Opinion of the International Searching Authority for PCT/2019/073278, May 19, 2020, P.B. 5818 Patentlaan 2, NL—2280 HV Rijswijk.

European Patent Office, Search Strategy for PCT/2019/073278, May 19, 2020, P.B. 5818 Patentlaan 2, NL—2280 HV Rijswijk.

Japanese Patent Office; "Notice of Reasons for Refusal" for corresponding Japanese Patent Application No. 2022-513640; Apr. 28, 2023. Submitted herewith. (English translation.).

European Patent Office, "Communication pursuant to Article 94(3) EPC" for corresponding EPO Application No. 19762368.9, Jan. 27, 2025, European Patent Office, Postbus 5818, 2280 HV Rijswijk, Netherlands.

The State Intellectual Property Office of the People's Republic of China, "The Second Office Action" with "Supplementary Search Report", Aug. 5, 2024, 6 Tucheng Road, West of Jimen Bridge, Haidian District, Beijing, China. (Counterpart foreign application CN 2019800997919).

English Translation Of: The State Intellectual Property Office of the People's Republic of China, "The Second Office Action" with "Supplementary Search Report", Aug. 5, 2024, 6 Tucheng Road, West of Jimen Bridge, Haidian District, Beijing, China. (Counterpart foreign application CN 2019800997919).

Li Jihong et al., "Beverage and cold drink recipes 1800 examples", Apr. 30, 2004, Light Industry Publishing, p. 264. **Document unable to be translated into English; however, the Office action explains its relevance.

Federal Service for Intellectual Property, Office Action for co-pending Application No. 2022107541/05 (015539) (Russia), Dec. 15, 2022, Federal Institute of Industrial Property, Berezhkovskaya nab. 30-1, Moscow, G-59, GSP-3, 125993 Russian Federation.

State Intellectual Property Office; Office Action issued in connection with counterpart Chinese Application No. 201980099791.9; Jan. 19, 2024; 7/F, Saite Plaza, No. 22 Jianwai Avenue, Chaoyang District, Beijing Beijing Jijia Intellectual Property Agency Co. Li Zengmiao ((8610) 59208888).

Lu Yan et al., Chemical Machinery, Petrochemical Industry Publishing House, Jul. 31, 1975, pp. 219-220.

* cited by examiner

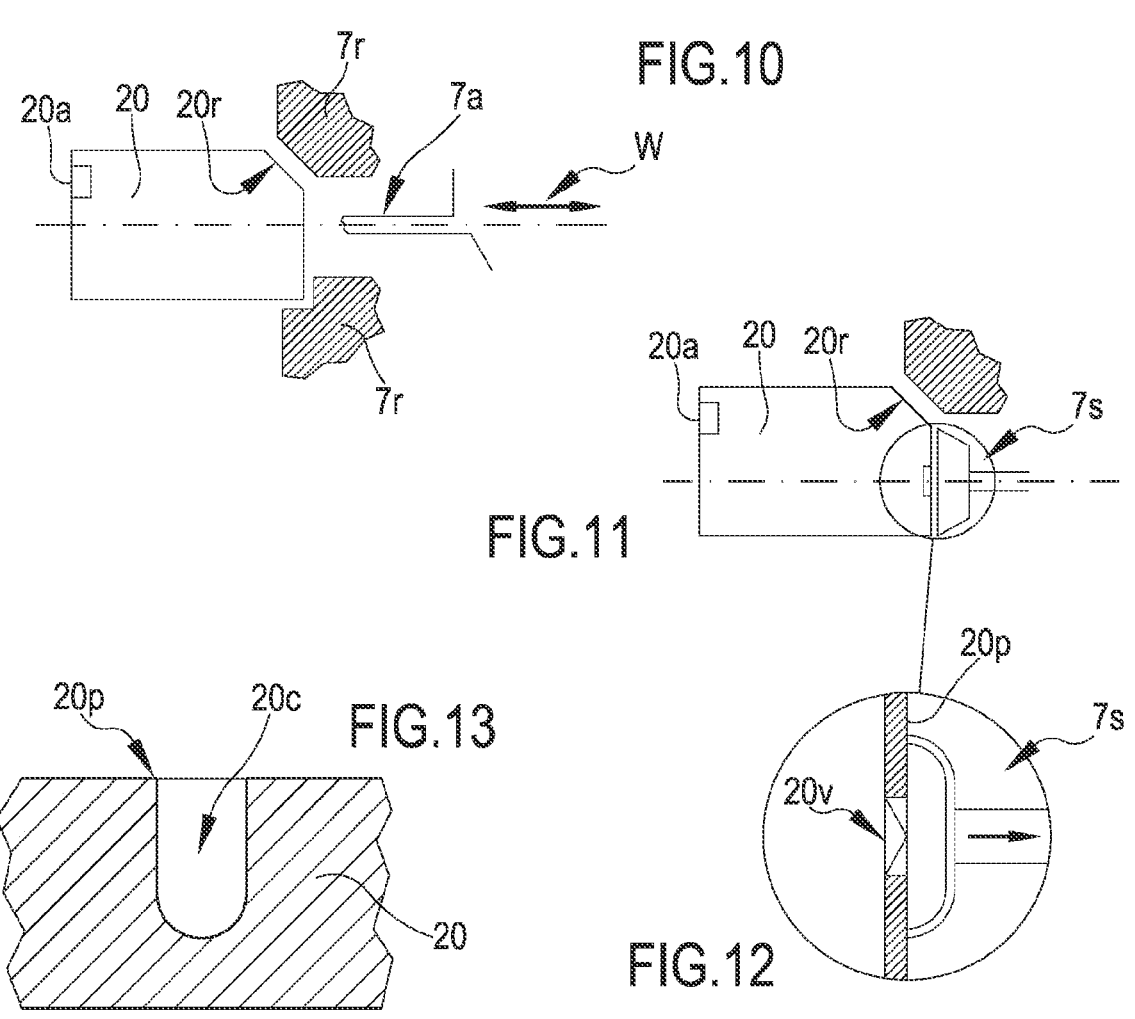
FIG.10
FIG.11
FIG.12
FIG.13
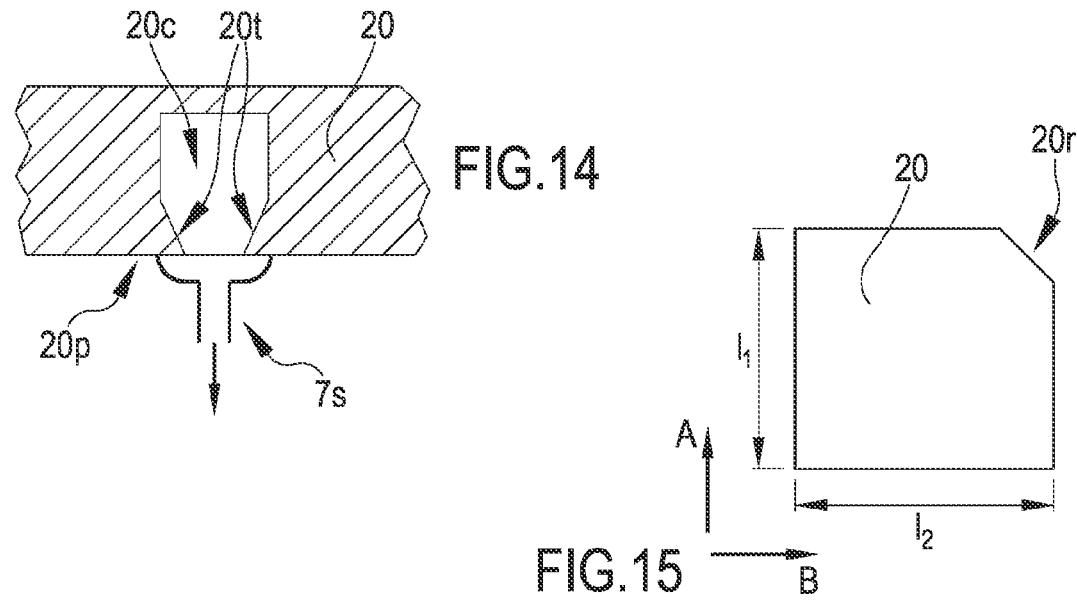
FIG.14
FIG.15

DEVICE FOR DISTRIBUTING MINERALIZED WATER AND ASSOCIATED METHOD

FIELD OF THE ART

The present disclosure refers to the field of the devices for distributing drinkable water, and in detail concerns a device for distributing mineralized water; the present disclosure also concerns a method for distributing mineralized water.

BACKGROUND ART

Today the distribution of drinkable mineral water is provided typically by distributing across several areas bottles of mineral water. Those bottles may be realized in glass or plastic material, e.g. PET.

While the cost of distribution of bottled mineral water in the areas surrounding the source is relatively negligible, especially if compared to a properly calculated price of sale per bottle, Applicant has observed that distribution of bottled mineral water to remote areas increases the costs of distribution and reduces sales margins. Moreover, if the environmental impact of distributing the bottled mineral water is taken into account, it can be observed that also in case said bottled mineral water is distributed in areas close to the source, its transport provides a relevant impact, at least in terms of pollution and/or CO2. The minimal consideration involves the specific weight of the water, which with a ton per cube meter is quite heavy to transport; relevant amounts of bottled mineral water thus require use of heavy loaded trucks, or should the case may be ships, which produce environmental pollution whose overall impact is not negligible, especially if the shipment requires long travels across the countries. A further consideration may involve the impact in terms of CO2 emissions, for producing the bottle itself.

The Applicant has further observed that consumption of bottled mineral water takes place all around the world, including remote areas (e.g. African countries) wherein provision of drinkable water is not easy, for contamination of waters present on place, or for substantial shortcomings of water.

The Applicant has further observed that immediately after the physiological need of water, the users choose water in accordance to price and, if the economic power so allows, in accordance to the taste thereof. It is substantially observed that the mixture of minerals dissolved in the water provide a typical taste and feeling when the user drinks a specific mineral water, and variations of said mixture may result in an alteration of this effect. The typical example may be observed when water is purified with sterilizing tablets, which provide a typical unpleasant taste to the water. This drawback, combined to the fact that sometimes the user may feel unsafe drinking water so which is sterilized only by means of tablets, lead to the request of bottled mineral water, provided that so there is someone—the firm producing the water—which at the eyes of the consumer provides for guarantee of pureness of water and absence of unpleasant feelings.

The Applicant has further observed that collection of bottled mineral water may be somewhat critical according to the specific condition of storage. Especially when plastic bottled mineral water is considered, it is known that storage may take place in cool, dry areas, without direct exposure at sunlight or heat sources. In any case, long-term storage of plastic bottled mineral water may result in a potential risk of release of substances from the plastic to the water itself. It may be noted that the use of glass bottled mineral water only partially solves this specific drawback, since glass bottling is associated—far more with respect to plastic bottling—to the risk of breaking and since glass bottles has a weight which is far more than that of plastic bottles, and thus have a more critical environmental impact.

The scope of the present disclosure is to provide a device and a method for distributing mineralized water which is capable to solve the aforementioned drawbacks.

SUMMARY

Relevant aspects of the disclosure will be disclosed in the following aspects, which may be combined together in any suitable combination, and/or may be combined with claims or part of the following detailed description.

According to an aspect it is herewith disclosed a device (1) for distributing mineralized water, said device comprising:

- an inlet (3), for loading water from an external source (100);
- a distillation unit (2), connected to the inlet (3) and configured to provide a distillation of an amount of water at least partially through heating, wherein said distillation unit (2) in turn comprises, or is operatively connected to, at least an heater (4) configured for providing heat in an amount sufficient to heat the amount of water at least up to a boiling temperature;
- a water distributor (5) configured for transferring a predetermined amount of distilled water (D) extracted from the distillation unit (2), to a removable container (10), the water distributor (5) being provided with an outlet nozzle or aperture (6) configured to face in use on said container (10);
- a mineralization unit (7) interposed between the distillation unit (2) and the outlet nozzle or aperture (6), said mineralization unit (7) being configured for accessing the inner cavity of a disposable capsule (20), containing a mineralized fluid solution or powder (M) in said cavity, for extracting at least part of said mineralized fluid solution or powder (M) from the capsule (20) and/or being configured for emptying the capsule (20) from the mineralized fluid solution or powder (M), and transferring at least part of the mineralized fluid solution or powder (M) from the capsule (20) to the water distributor (5);
- the device, optionally through the water distributor (5), being configured to mix the mineralized fluid solution or powder (M) with the predetermined amount of distilled water (D) transferred by the water distributor (5) to the removable container (10).

According to another aspect of the disclosure, the predetermined amount of distilled water (D) transferred by the water distributor (5) to the removable container (10) corresponds to at least a part of the water contained in the distillation unit (2), and the device, optionally through said water distributor (5), is configured to mix the amount of distilled water transferred by the water distributor (5) to the removable container (10), water (D), with the mineralized fluid solution or powder (M) in a ratio, defined as the amount of mineralized fluid solution or powder (M) over the amount of distilled water (D), less than 1, and/or wherein the amount of distilled water (D) is greater than the amount of mineralized fluid solution or powder (M).

According to another aspect of the disclosure, the device (1) is configured to mix the mineralized fluid solution or powder (M) with the predetermined part of the amount of distilled water (D) before the exit through the outlet nozzle or aperture (6).

According to another aspect of the disclosure, the device (1), optionally through the mineralization unit (7) is configured to substantially fully extract the mineralized fluid solution or powder (M) from the capsule, and/or to fully extract the mineralized fluid solution or powder (M) from the capsule.

According to another aspect of the disclosure, the device is configured to mix the mineralized fluid solution or powder (M) with the predetermined amount of distilled water (D) transferred by the water distributor (5) to the removable container (10) by making at least part of the predetermined amount of distilled water (D) to flow into the capsule (20), and/or the mineralization unit (7) is configured to receive at least part of the predetermined amount of distilled water (D) extracted from the distillation unit (2) and to make it pass or flow into the capsule (20) before being directed to the water distributor (5).

According to another aspect of the disclosure, the device (1) is configured to mix the mineralized fluid solution or powder (M) with the predetermined part of distilled water (D) transferred by the water distributor (5) to the removable container (10) in substantial correspondence of the water distributor (5).

According to another aspect of the disclosure, the device (1) further comprises a cooling unit (8) interposed between the distillation unit (2) and the mineralization unit (7), the cooling unit (8) being configured to cool down water exiting from the distillation unit (2) and/or configured for allowing condensation thereof, said cooling unit (8) optionally comprising at least one actively fed cooler, in particular Peltier cell.

According to another aspect of the disclosure, said distillation unit (2) is provided with at least one wall concurring in defining an inner cavity suitable to house liquids, said at least one wall having an inner face facing said cavity, said inner face comprising a bacteriostatic material, optionally a bacteriostatic metal comprising silver and/or copper.

According to another aspect of the disclosure, the distillation unit (2) is provided with at least one wall concurring in defining an inner cavity suitable to house liquids, said at least one wall having an inner face facing said cavity and is installed on a vibrator (11) and/or ultrasonic source, or is provided with a vibrator (11) and/or ultrasonic source, configured for preventing attachment of distillation particles or residuals to an inner face of the distillation unit (2).

According to another aspect of the disclosure, the distillation unit (2) is provided with an upper portion (2u) and a lower portion (2l) detachably connectable to the upper portion (2u), optionally through a screw threading (2t) so arranged on the lateral walls of the upper portion (2u) and of the lower portion (2l).

According to another aspect of the disclosure, the distillation unit (2) is provided with a plate column or tray column, comprising at least one plate or tray (12) arranged in the inner cavity and defining at least one passage (14) of a reduced size between a lower zone of the cavity arranged below the plate or tray (12) and an upper zone of the cavity above the plate or tray (12), optionally wherein the plate column or tray column forces a passage of said vapor in a curved path before exiting the distillation unit (2) and/or optionally wherein the plate or tray (12) comprises at least one domed structure (13) arranged in substantial correspondence of said passage (14), in particular above the passage (14), for forcing the flow of the vapor along a curved path.

According to another aspect of the disclosure, the device is configured to perform at least the distillation under vacuum conditions, and/or the distillation unit (2) is a vacuum distillation unit, and the distillation of the water takes place at a pressure below the atmospheric pressure.

According to another aspect of the disclosure, the device (1) comprises a vacuum pump (16) having an inlet connected to the distillation unit (2) suitable to provide vacuum at least in said distillation unit (2), said vacuum pump (16) being configured to extract at least part of the air contained in a top upper portion of the distillation unit (2).

According to another aspect of the disclosure, the distillation unit (2) is provided with a bottom wall shaped to define a recess (2r) within with at least a part of the bottom wall protrudes, optionally wherein the recess (2r) is in correspondence of a central portion of the distillation unit (2) itself.

According to another aspect of the disclosure, the recess (2r) has a bottom wall, optionally substantially orthogonal with respect to a longitudinal axis (X) of the distillation unit (2), the recess being provided with a protruding portion (2p) substantially protruding orthogonally with respect to the bottom wall of the recess and defining thus an annular zone of the recess suitable to house at least a part of the heater (4).

According to another aspect of the disclosure, the heater (4) is an induction heater (4), optionally being at least partially circularly surrounding the lateral wall of the distillation unit (2) or being arranged substantially underneath a bottom portion of the distillation unit (2).

According to another aspect of the disclosure, the heater (4) is provided with a first outer ring (4o) at least partially circularly surrounding the lateral wall of the distillation unit (2) and with a second inner ring (4i) being configured to introduce in the annular zone of the recess (2r).

According to another aspect of the disclosure, the distillation unit (2) has an inlet opening connected to the inlet (3) of the device, optionally wherein the device (1) comprises at least one filter and/or at least one feeding pump arranged between the inlet opening and the inlet (3) of the device.

According to another aspect of the disclosure, the distillation unit (2) is provided with an outlet, and the device comprises a storage chamber (9) suitable to store distilled water after it has left the distillation unit (2), the storage chamber (9) being arranged downstream the cooling unit (8).

According to another aspect of the disclosure, the storage chamber (9) is provided with a cooling unit, configured to cool down the distilled water (D) exiting from the distillation unit (2) and/or configured for allowing condensation thereof, said cooling unit optionally comprising at least one actively fed cooler, in particular a Peltier cell.

According to another aspect of the disclosure, the cooling unit (8) is provided with a storage chamber, suitable to house at least a part, preferably all, the amount of distilled water (D) exited from the distilled unit (2), the storage chamber being provided, preferably at least partially surrounded, by one actively fed cooler, in particular a Peltier cell.

According to another aspect of the disclosure, the distillation unit (2) is at least partially provided with a metal body suitable to be heated by induction, in particular by RF induction.

According to another aspect of the disclosure, the device (1) comprises at least one delivery pump (1p) or electrically and/or mechanically controlled valve arranged downstream of an outlet of the storage chamber (9) and upstream the water distributor (5).

According to another aspect of the disclosure, the device (1) comprises at least one delivery pump (1p) or electrically and/or mechanically controlled valve arranged downstream an outlet of the distillation unit (2) and optionally upstream the water distributor (5).

According to another aspect of the disclosure, the delivery pump (1p) is configured to cause the forcing of liquid flow into the water distributor (5).

According to another aspect of the disclosure, the water distributor (5) comprises at least a first inlet port connected to the distillation unit (2) and a second inlet port connected to the mineralization unit (7), optionally wherein the first inlet port is connected to the distillation unit (2) through the cooling unit (8) and/or through the storage chamber (9).

According to another aspect of the disclosure, the water distributor (5) is configured to provide a vortex mixing of the distilled water with the mineralized fluid solution or powder (M) extracted from the capsule (20) before they pass through the outlet (6).

According to another aspect of the disclosure, water distributor (5) is configured to providing spraying and/or micronizing and/or nebulizing the mineralized fluid solution or powder (M) with the distilled water.

According to another aspect of the disclosure, the mineralization unit (7) comprises a mineralization pump (7p) configured to force extraction of the mineralized fluid solution or powder (M) from the capsule (20) and to provide injection of the mineralized fluid solution or powder (M) extracted from the capsule (20) into the second inlet of the water distributor (5).

According to another aspect of the disclosure, the device (1) comprises a UV sterilizer (15) configured to allow sterilization of at least a part of the removable container (10) when installed in a sterilization position on or in correspondence of the device, and/or configured to allow sterilization of at least a part of the distilled water (D) and/or at least a part of the distilled water (D) with the mineralized fluid solution or powder (M) water before the distribution form the outlet nozzle or aperture (6).

According to another aspect of the disclosure, the UV sterilizer (15) is arranged in substantial correspondence of the water distributor (5), optionally being installed on the water distributor (5), so that its radiation pattern is substantially axially aligned with at least part of the removable container (10) and/or entering the container (10) in substantial correspondence of an aperture thereof, and so that during the distribution through outlet nozzle or aperture (6) at least part of the removable container (10), optionally the bottom thereof, is radiated with UV radiation simultaneously with water delivered from the distillation unit (2) and/or through the delivery pump (1p) and/or with the mix of said predetermined amount of water (D) with the mineralized fluid solution or powder (M).

According to another aspect of the disclosure, the mineralization unit (7) comprises a movable extraction element (7s), or a movable puncturing element (7a), selectively displaceable in at least a first configuration wherein it does not interact with the capsule (20) or in a second configuration wherein it does interact with the capsule (20) optionally puncturing it, for extracting the mineralized fluid solution or powder (M) therefrom.

According to another aspect of the disclosure, the device (1) comprises a level sensor (2s) arranged in substantial correspondence of the distillation unit (2), said level sensor (2s) being configured to provide a signal proportional to the level of the water inside the distillation unit (2).

According to another aspect of the disclosure, the extraction element (7s) or movable puncturing element (7a), in said second configuration, is configured to create a sealed contact with at least a part of the capsule (20).

According to another aspect of the disclosure, the capsule (20) is provided with an auxiliary aperture (20a) configured to allow air and/or fluid enter the inner cavity at least during the extraction or emptying of the capsule (20), and/or is configured to be opened in correspondence of an auxiliary aperture (20a), for allowing the introduction of air and/or fluid at least during the extraction or emptying from the mineralized fluid solution or powder (M).

According to another aspect of the disclosure, the mineralization unit (7) is configured to introduce a fluid, optionally at least water, in particular a part of the distilled water distilled by the distillation unit (2) into the capsule (20), optionally being configured to introduce into the capsule (20) the fluid, optionally at least water, in particular a part of the distilled water distilled by the distillation unit (2) through said auxiliary aperture (20a) or by opening or puncturing the capsule (20) in correspondence of a second position, differing from the first position at which the extraction element (7s) or the movable puncturing element (7a) is configured to interact with the capsule (20).

According to another aspect of the disclosure, the device comprises an actuating mechanism, movable between at least a first configuration in correspondence of which it allows the introduction of the capsule (20) into the mineralization unit (7) and a second configuration in correspondence of which it causes the opening of the capsule (20), said actuating mechanism being configured to be actuated at least partially by direct contact of the user.

According to another aspect of the disclosure, moving the lever between the first and the second configuration causes the motion of the movable equipment between the first and the second position.

According to another aspect of the disclosure, the mineralization unit (7) is provided with a kicker or pushing element, movable between a first position at which it does not contact the capsule (20) and a second position at which it contacts the capsule (20) with a suitable force to cause its falling into the hopper (7h).

According to another aspect of the disclosure, the device (1) is configured to perform cyclic distillation and distribution of water, optionally wherein each cycle at least comprises:

loading a predetermined amount of water to be distilled into the distillation unit (2);

activating the at least one heater (4) for an amount of time sufficient to cause the distillation of at least a part of the water contained into the distillation unit (2), optionally the whole content of water contained in the distillation unit (2), activating at least one cooling unit (8) causing the condensation of distillation vapour outside the distillation unit (2), obtaining a predetermined amount of distilled water (D), delivering, optionally through said delivering pump (1s), the predetermined amount of distilled water (D) to a water distributor (5), wherein the predetermined amount of distilled water (D) is mixed with the mineralized fluid solution or powder (M) extracted from the capsule (20), optionally so that the capsule (20) can be disposed or thrown away, distributing the predetermined amount of distilled water (D) mixed with the mineralized fluid solution or powder (M) to the removable container (10).

According to another aspect of the disclosure, the device is configured to perform distillation of the water at a pressure below the atmospheric pressure, and to re-establish normal atmospheric pressure in the distillation unit (2) after the distillation of the water contained in the distillation unit (2) is completed and/or after the distillation (2) is emptied from the water previously contained, optionally contained at the starting of the cycle.

According to another aspect of the disclosure, the mineralization unit (7) comprises a movable equipment configured to interact with the capsule (20), in particular configured to limit the movement of the capsule (20); the mineralization unit (7) being configured to cause the falling of the capsule (20) in a hopper (7h) after the opening of the capsule (20) as a result of a relative motion between the capsule (20) and the movable equipment.

According to another aspect of the disclosure, the mineralization unit (7) is configured to retain the capsule (20) preventing its falling into the hopper (7h) before the opening of the capsule (20) operated through the motion of the movable equipment.

According to another aspect of the disclosure, the movable equipment is provided with a retaining wall (7r) against which the capsule strikes at least at the moment of the introduction into the mineralization unit; said retaining wall (7r) further defining an housing for at least part of the capsule.

According to another aspect of the disclosure the kicker or pushing element is configured to move between the first and the second position with a speed or force sufficient to cause the release of the capsule (20) from the contact with the retaining wall (7r).

According to another aspect of the disclosure, the mineralization unit (7) is configured to cause the capsule (20) enters the mineralization unit (7) so that to be axially offset and inclined with respect to an axis (B) of the housing or recess defined by the retaining wall (7r).

According to another aspect of the disclosure, during the motion of the movable equipment from a first position to a second position the capsule (20) is forced to reduce progressively the offset and inclination of an own axis (A) to get partially into the housing resulting substantially axially aligned with the axis (B) of the housing According to another aspect of the disclosure, the movable equipment is provided with a tooth (7k) optionally arranged in the front part of the retaining wall (7r); the tooth (7k) is configured to engage the capsule (20), optionally in correspondence of a front tooth (20t) thereof, the tooth (7k) being configured either:

to favor the distancing of the capsule (20) from a back wall (7b) of the mineralization unit (7) and to cause, following the distancing, the falling of the capsule (20) into the hopper (7h); or to favor the separation of the capsule (20) from the movable equipment, to allow the falling of the capsule into the hopper (7h).

According to another aspect of the disclosure, the tooth (7k) is solidly fixed to the movable equipment.

According to another aspect of the disclosure, the tooth (7k) is arranged on a fixed portion of the mineralization unit (7), in particular distinct from the movable equipment.

According to another aspect of the disclosure, the capsule (20) is provided with a back ring (20u), optionally arranged at a back end portion of the capsule (20), the back ring (20u) protruding from the lateral wall of a lateral wall of the capsule (20) and being configured to engage the tooth (7k).

According to another aspect of the disclosure, the mineralization unit (7) is configured in such a way to allow introduction of the capsule (20) between the back wall (7b) and the movable equipment, optionally in such a way that the back ring (20u) of the capsule lies between the tooth (7k) and the back wall (7b).

According to another aspect of the disclosure, the actuating mechanism (1m) or lever is connected to the movable equipment through a bevel mechanism and/or through a toothed wheel-rack coupling.

According to another aspect of the disclosure, the device comprises a control unit (30) configured to cause at least one cycle comprising:

the activation of an electrically and/or mechanically controlled valve (3v) or a pump (3p) for causing the loading a predetermined amount of water into the distillation unit (2);

the activation of the at least one heater (4) for an amount of time sufficient to cause the distillation of at least a part of the water contained into the distillation unit (2), optionally the whole content of water contained in the distillation unit (2), to be distilled, the activation of the at least one cooling unit (8) causing the condensation of distillation vapour outside the distillation unit (2), obtaining a predetermined amount of distilled water (D), the delivering, optionally through activation of said delivering pump (1s), of the predetermined amount of distilled water (D) to a water distributor (5), wherein the predetermined amount of distilled water (D) is mixed with the mineralized fluid solution or powder (M), the mixing the predetermined amount of distilled water (D) with the mineralized fluid solution or powder (M) to the removable container (10), through the water distributor (5).

According to another aspect of the disclosure, the control unit (30) is configured to activate, in the cycle, the UV sterilizer (15) at least for the time necessary to perform the mixing of the predetermined amount of distilled water (D) with the mineralized fluid solution or powder (M) and to complete the delivery of the resulting mix to the removable container (10).

According to another aspect of the disclosure, the control unit (30) is configured to activate, in the cycle, the vacuum pump (16) fora predetermined amount of time, and/or to activate the vacuum pump (16) and then to deactivate a vacuum pump (16) after a predetermined vacuum level is obtained within said distillation unit (2).

According to another aspect of the disclosure, the control unit (30) is configured to activate at least one vibrator (11) or ultrasonic source, arranged in substantial correspondence and/or contact and/or within, the distillation unit (2).

According to another aspect of the disclosure, the mineralization unit (7) comprises a movable equipment configured to interact with the capsule (20), in particular configured to limit the movement of the capsule (20); the mineralization unit (7) being configured to cause the falling of the capsule (20) in a hopper (7h) after the opening of the capsule (20) as a result of a relative motion between the capsule (20) and the movable equipment.

According to another aspect of the disclosure, the mineralization unit (7) is configured to retain the capsule (20) preventing its falling into the hopper (7h) before the opening of the capsule (20) operated through the motion of the movable equipment.

According to another aspect of the disclosure, the movable equipment is provided with a retaining wall (7r) against which the capsule strikes at least at the moment of the introduction into the mineralization unit; said retaining wall (7r) further defining an housing for at least part of the capsule.

According to another aspect of the disclosure is herewith disclosed a computer program product, suitable to be stored in a memory support, said program product comprising software code portions that when executed by said control unit (30) cause the execution at least of said one cycle.

According to another aspect of the disclosure, said mineralized fluid solution or powder (M) is a solution of minerals dissolved in pure and/or de-bacterized, distilled water.

According to another aspect is herewith disclosed a method for distributing a mineralized water, the method comprising the following steps:

loading a predetermined amount of water to be distilled into a distillation unit (2);

activating at least one heater (4) for an amount of time sufficient to cause the distillation of at least a part of the water contained into the distillation unit (2), optionally the whole content of water contained in the distillation unit (2), condensing a distillation vapour outside the distillation unit (2), obtaining a predetermined amount of distilled water (D), optionally through a cooling unit (8) connected to the distillation unit (2), delivering, optionally through a delivering pump (1s), a predetermined amount of distilled water (D) to a water distributor (5), wherein the predetermined amount of distilled water (D) is mixed with a mineralized fluid solution or powder (M), distributing the predetermined amount of distilled water (D) mixed with the mineralized fluid solution or powder (M) to the removable container (10), wherein the mixing is performed by extracting the mineralized fluid solution or powder (M) from a disposable capsule (20) or by emptying the disposable capsule (20) from said mineralized fluid solution or powder (M).

According to another aspect of the disclosure, the steps according to the previous aspect are performed cyclically, optionally in an electronically controlled cyclic operation, optionally in such a way for each removable container (10) to be filled with mineralized water, the steps according to the previous aspect are at least provided once.

According to another aspect of the disclosure, obtaining predetermined amount of distilled water (D) and then distributing the predetermined amount of distilled water (D) mixed with the mineralized fluid solution or powder (M) to the removable container (10) is a process of demineralization and subsequent re-mineralization of water, realized through a device (1) for distributing mineralized water comprising said distillation unit (2).

According to another aspect of the disclosure, the mixing is performed at a predetermined ratio, the ratio being defined as the amount of mineralized fluid solution or powder (M) over the amount of distilled water (D), and wherein the ratio is less than 1, and/or wherein the amount of distilled water (D) is greater than the amount of mineralized fluid solution or powder (M).

According to another aspect of the disclosure, extracting the mineralized fluid solution or powder (M) from a disposable capsule (20) or emptying the disposable capsule (20) from said mineralized fluid solution or powder (M) is performed by means of accessing the capsule (20) in correspondence of a first position, optionally in correspondence of a first aperture, at which the mineralized fluid solution or powder (M) is extracted from the capsule (20) and by means of accessing the capsule (20) in correspondence of a second position, optionally in correspondence of an auxiliary aperture (20a), wherein in correspondence of the second position fluid, in particular water, and/or air, is forced or allowed to enter into the inner cavity of the capsule (20) wherein the mineralized fluid solution or powder (M) is contained.

According to another aspect of the disclosure, extracting the mineralized fluid solution or powder (M) from a disposable capsule (20) or emptying the disposable capsule (20) from said mineralized fluid solution or powder (M) is performed by making at least part of the predetermined amount of distilled water (D) flow into the capsule (20), optionally by making substantially the entire amount of distilled water (D) distilled from the distillation unit (2) flow into the capsule (20).

According to another aspect of the disclosure, the method comprises a step of introducing a capsule (20) into a slot (7a) of a device (1) for distributing mineralized water, wherein the capsule (20) is opened by extraction elements (7s) or puncturing elements (7a) of the device (1), for extracting the mineralized fluid solution or powder (M) therefrom, optionally wherein the step of introducing the capsule into the slot (7a) of the device (1) for distributing mineralized water takes place before the delivering of the predetermined amount of distilled water (D) to a water distributor (5) and/or before distributing the predetermined amount of distilled water (D) mixed with the mineralized fluid solution or powder (M) to the removable container (10).

According to another aspect of the disclosure, loading a predetermined amount of water to be distilled into a distillation unit (2) comprises feeding the predetermined amount of water to be distilled into the distillation unit (2) through an activation, optionally an electrically controlled activation, of an inlet pump (3p) or through an opening, optionally an electrically controlled opening, of an inlet valve (3v), said inlet pump (3p) or said inlet valve (3v) being connected to a source (100) of water.

According to another aspect of the disclosure, loading a predetermined amount of water to be distilled into a distillation unit (2) comprises comparing a signal provided by a level sensor (2s) arranged in correspondence of the distillation unit (2) and configured to detect the level of water inside the distillation unit (2) with a predetermined level threshold, and interrupting the loading at the moment the signal provided by the level sensor (2s) corresponds to a level equal or exceeding said the predetermined level threshold.

According to another aspect of the disclosure, the activation of the at least one heater (4) is performed after the loading of the predetermined amount of water to be distilled into the distillation unit (2) is completed.

According to another aspect of the disclosure, the delivering, optionally through the delivering pump (1s), of the predetermined amount of distilled water (D) to a water distributor (5) at which the predetermined amount of distilled water (D) is mixed with a mineralized fluid solution or powder (M), takes place after the distillation of the water contained in the distillation unit (2) is completed and/or after the distillation unit (2) is empty.

According to another aspect of the disclosure, the delivering is triggered by a control unit (30) in a step of electronically comparing the signal provided by the level sensor (2s) with the level threshold and with a subsequent electronic sending of a signal of activation of at least one delivering pump (1p) in particular feeding the water distributor (5).

According to another aspect of the disclosure, extracting the mineralized fluid solution or powder (M) from the capsule (20) is performed after the distillation of the water contained in the distillation unit (2) is completed and/or after the distillation unit (2) is empty.

According to another aspect of the disclosure, the method comprises establishing a pressure below the atmospheric pressure in the distillation unit (2) at least for the time necessary to perform, in particular to complete, the step of distillation of the water contained in the distillation unit (2), and to re-establish normal atmospheric pressure in the distillation unit (2) after the distillation of the water contained in the distillation unit (2) is completed and/or after the distillation unit (2) is emptied from the water previously contained, optionally contained at the starting of the cycle.

According to another aspect of the disclosure, the method comprises causing the distillation unit (2) to vibrate at a predetermined frequency, optionally comprised in the ultrasonic domain, to substantially impede the attachments of the distillation residuals on the inner wall thereof, or reduce the amount of distillation residuals attached on the inner wall thereof.

According to another aspect of the disclosure, the method comprises causing the distillation unit (2) to vibrate at a predetermined frequency by activating a vibrator (11) and/or an ultrasonic source arranged in substantial correspondence and/or contact and/or within and/or below, the distillation unit (2).

According to another aspect of the disclosure, the method comprises stopping the vibrator (11) and/or ultrasonic source after the distillation unit (2) is emptied from the water previously contained and/or after the distillation of the water contained in the distillation unit (2) is completed.

According to another aspect of the disclosure, the method further comprises a step of sterilization of at least a part of said container (10) and/or of said predetermined amount of distilled water (D) and/or the mixture of the predetermined amount of distilled water (D) and/or of the mineralized fluid solution or powder (M), said step of sterilization comprising activating a UV sterilizer (15) to produce a UV radiation pattern substantially axially aligned with at least part of the removable container (10) and/or entering the container (10) in substantial correspondence of an aperture thereof, the method comprising radiating with the UV radiation produced by the UV sterilizer (15) at least part of the removable container (10), optionally the bottom thereof, simultaneously with water delivered from the distillation unit (2) and/or through the delivery pump (1p) and/or with the mix of said predetermined amount of water (D) with the mineralized fluid solution or powder (M).

According to another aspect of the disclosure, the method comprises a step of opening the capsule (20) in correspondence of at least a first portion thereof, and comprises a step of causing the falling of the capsule (20) into a hopper (7h) following the opening of said capsule.

According to another aspect of the disclosure, the falling of the capsule (20) into the hopper (7h) is caused by the motion of a movable equipment of the mineralization unit (7).

According to another aspect of the disclosure, the method comprises moving the movable equipment of the mineralization unit (7) from a first position in correspondence of which the capsule is still closed to a second position at which the capsule is opened, in particular through the action of the movable equipment, and the falling of the capsule (20) into the hopper (7h) is due or follows the motion of the movable equipment back to the first position after the capsule is opened.

According to another aspect of the disclosure, the method comprising trapping the capsule between a back wall (7b) of the mineralization unit and the movable equipment, in particular a retaining wall (7r) of the movable equipment, said method comprising causing the capsule (20) enter the mineralization unit (7) so that to be axially offset and inclined with respect to an axis (B) of the housing or recess defined by the retaining wall (7r).

According to another aspect of the disclosure, during the motion of the movable equipment from a first position to a second position the capsule (20) is forced to reduce progressively the offset and inclination of an own axis (A) to get partially introduced into the housing, resulting substantially axially aligned with the axis (B) of the housing.

According to another aspect of the disclosure, the movable equipment is provided with a tooth (7k) optionally arranged in the front part of the retaining wall (7r) and configured to engage the capsule (20), in particular a front tooth (20t) thereof, the tooth (7k) being configured to favor the distancing of the capsule (20) from a back wall (7b) of the mineralization unit (7) and to cause, following the distancing, the falling of the capsule (20) into the hopper (7h).

According to another aspect of the disclosure, during the motion of the movable equipment from the second position to the first position, at least part of the capsule (20), in particular a back ring (20u) protruding from the lateral wall of the capsule (20) and/or being arranged substantially in correspondence of a back end portion of the capsule (20), strikes against a tooth (7k) arranged on the fixed portion of the mineralization unit (7).

According to another aspect of the disclosure, after the capsule (20) has struck the tooth (7k), falls into the hopper (7h), optionally for gravity and/or through the help of a force exerted by a kicker or pushing element.

According to another aspect of the disclosure, the method comprises actuating a kicker or pushing element, movable between a first position at which it does not contact the capsule (20) and a second position at which it contact the capsule (20), so that at least it moves from the first to the second position thereby forcing and/or helping the capsule (20) to exit from a housing realized by the retaining wall (7r) and/or to separate from the back wall (7b).

According to another aspect of the disclosure, the method comprises a step of introducing the capsule (20) into the mineralization unit (7) so that a back ring (20u) protruding from the lateral wall of the capsule (20) and/or being arranged substantially in correspondence of a back end portion of the capsule (20) is interposed between a back wall (7b) of the mineralization unit (7) and at said tooth (7k).

According to another aspect of the disclosure, through the mineralization unit (7) a mineralization of distilled water is realized substantially at room temperature or below the room temperature.

According to another aspect of the disclosure, extracting the mineralized fluid solution or powder (M) from a disposable capsule (20) or emptying the disposable capsule (20) from said mineralized fluid solution or powder (M) is caused by, and/or follows, a motion of an actuating mechanism (1m) from a first configuration, at which the capsule (20) can be introduced into the mineralization unit (7), from a second configuration at which said mineralization unit (7) is configured to open the capsule (20).

According to another aspect of the disclosure, the motion of the actuating mechanism (1m) comprises the motion of an actuating lever from a first position to a second position.

According to another aspect of the disclosure, the actuating mechanism (1m) or lever is connected to the movable equipment through a bevel mechanism and/or through a toothed wheel-rack coupling, and said motion causes the motion and/or rotation of the bevel and/or of the toothed wheel-rack coupling.

DESCRIPTION OF FIGURES

Some non-limiting embodiments of the object of the present disclosure will be presented in the following detailed description and are shown in the annexed figures, wherein:

FIG. 10 shows a first lateral view of a portion of a device for opening a capsule, said device being part of the overall device according to the present disclosure;

FIG. 11 shows a second lateral view of a portion of the device for opening the capsule, said device being part of the overall device according to the present disclosure;

FIG. 12 shows a detail of the device of FIG. 11;

FIG. 13 shows a portion of a first embodiment of the capsule;

FIG. 14 shows a portion of a second embodiment of the capsule;

FIG. 15 shows a plan view of an embodiment of the capsule;

DETAILED DESCRIPTION

Figures 1, 2, 3:
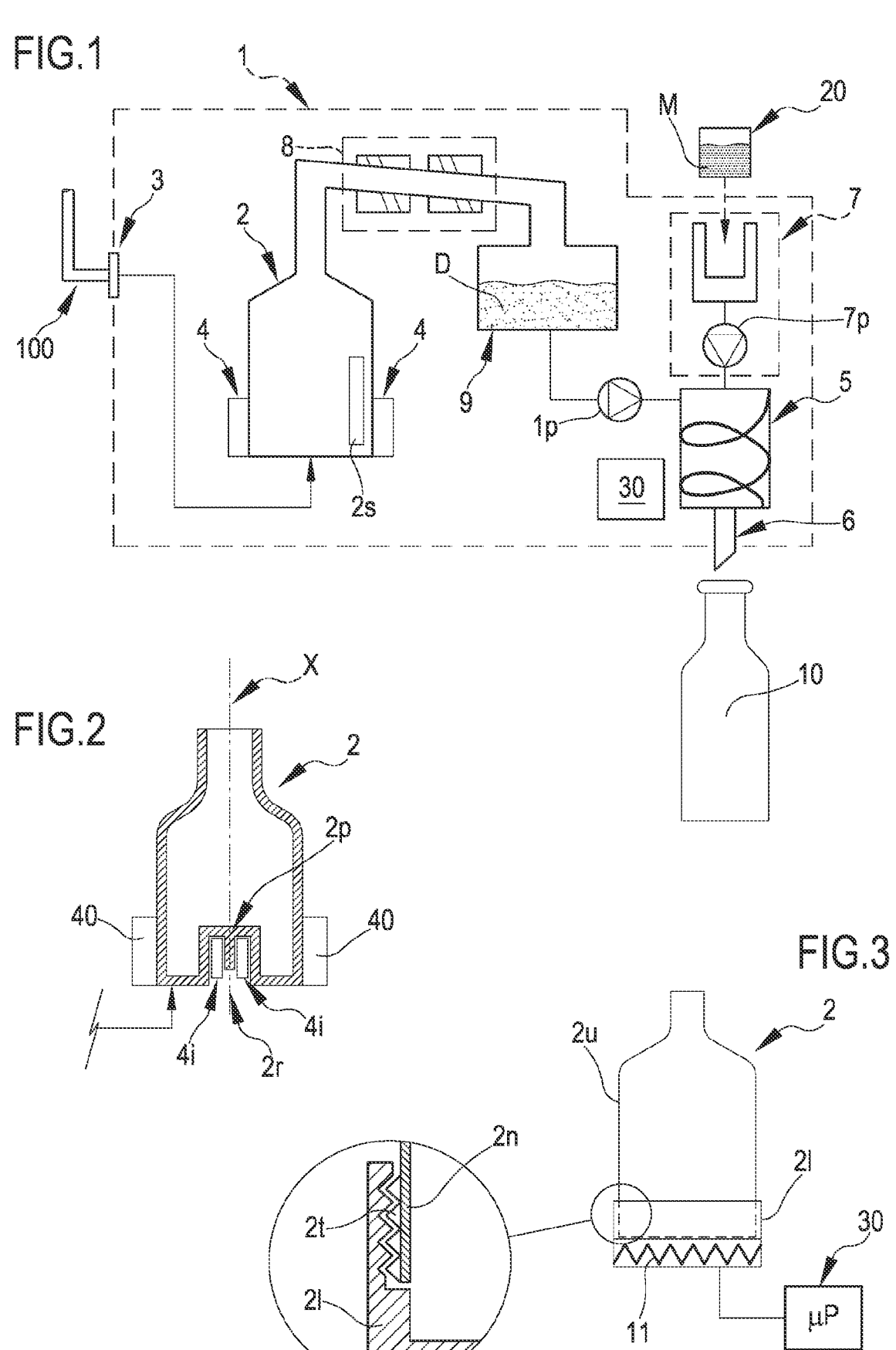
FIG. 1 shows a schematic view of an embodiment of the device according to the present disclosure.
FIG. 2 shows a section view of an embodiment of the distillation unit of the device.
FIG. 3 shows a lateral view of another embodiment of the distillation unit of the device.

In FIG. 1, with the reference number 1 is shown in its complex a device for distributing mineralized water.

In its simplest conception the device according to the present disclosure provides for demineralizing a predetermined amount of water through distillation, producing a distilled vapour that is then condensed resulting in a predetermined amount of distilled water D, and then provides for mixing the aforementioned predetermined amount of distilled water D with a mineralized fluid solution or powder M extracted from a disposable capsule, identified in the present description with reference number 20, for introducing the mix in a removable container 10, e.g. a bottle, obtaining a mineralized water with a predefined and calculated amount of minerals. In practice, the device according to the present disclosure first de-mineralizes the water that receives from the external source—in order to provide a de-mineralized water deprived with any unwanted combination of minerals or any harmful or unwanted or unpleasant tasting mineral—and then re-mineralizes the water with an appropriate mix of minerals chosen by the user, through the capsules 20. Inter alia this is why the device which is object of the present disclosure is called "for distributing mineralized water": the water is not simply mineral, but is subjected to a process of demineralization and then re-mineralization (emphasis added) through the capsule.

The device object of the present disclosure may be advantageously used as a home appliance, albeit in a non-limiting embodiment may be configured to be used as an industrial device; in the first case, it may have a conveniently designed case, and may be provided with a slot 7a which allows the capsule 20 to be introduced into the body of the device itself. The case, may be preferably opaque, so as to cover the technical elements therein contained, and at least for covering a mineralization unit 7 that the slot 7a allows to access.

For the purposes of the present disclosure, as per "disposable capsule" shall be intended a capsule which can be used only a single time, and in particular a capsule configured to be disposed or thrown away once the content of mineralized fluid solution or powder M therein contained is fully so extracted.

The device 1 according to the present disclosure is specifically conceived for domestic use, and may therefore be installed as a desktop device.

Preferably, albeit in a non-limiting extent, at least part of the capsule may be realized in aluminum or in any recyclable material. This way, the capsule contributes to a reduction of the environmental pollution in terms of wastes deriving from the usage of the system here disclosed.

Advantageously, the mineralized fluid solution or powder M does not contain any chemicals apart from purified, sterile, water with an appropriate amount of minerals therein dissolved.

The ratio of mixing between the amount of mineralized fluid solution or powder M contained in the capsule 20 and delivered to the container and the predetermined amount of water to be delivered to the container 10, or equivalently the amount D of distilled water, is less than 1, in particular significantly less than 1. This means that the amount of distilled water D is greater than the amount of mineralized fluid solution or powder M, in particular far greater than the amount of mineralized fluid solution or powder M. In a non-limiting embodiment, the capsule may be configured to house between 20 ml to 30 ml of mineralized fluid solution, sufficient to fill a container in a form of a standard ¾ l to 1 l of capacity. Thanks to this aspect, a great saving of weight can be obtained for a predetermined amount of final mineralized water in the container 10 over the traditional bottles. Substantially, if for simplicity we exclude from the calculation the weight of the housing of the capsule itself, the advantage may be of about the ratio 20-30 ml over ¾-1 l of water. It is noted that the water to be distilled is taken at the place the device 1 is installed, and thus, for the purposes of the present calculation, it is not kept into account. In fact, thanks to the present device the delivery is made only for the capsules 20, and thus the costs of shipping and the volumes are only associated to the capsules themselves.

The capacity of the inner cavity of the capsule 20 may be realized in accordance to said ratio, but also keeping into account the maximum allowable dissoluble minerals per amount of water; for the Applicant, it is important that the capsule 20 contains water wherein minerals are fully dissolved. This aspects allows for providing uniform distribution of the mineralized fluid solution or powder M into the aforementioned amount of distilled water D. A typical size of the capsule 20 may be that to house 5 ml of solution M, or 10 ml of solution M, or 20 ml of solution M.

As disclosed in FIG. 1, the device 1 at least comprises:

an inlet 3 configured to allow a water loading from an external source, which may be a pressurized water source like for example a white water conduit, or, alternatively, a non-pressurized water source like a basin or a pond;

a distillation unit 2 connected to the inlet 3 and configured to provide a distillation of an amount of water at least partially through heating, an heater 4 operatively connected to the distillation unit 2 and configured for providing heat to the distillation unit 2 in an amount sufficient to heat the amount of water at least up to a boiling temperature, a water distributor 5, which is configured for transferring at least a predetermined part of the amount of water contained in the distillation unit 2 or in particular the predetermined amount of distilled water D to the container 10, through an outlet nozzle or aperture 6 configured to face in use on the container 10;

a mineralization unit 7 interposed between the distillation unit 2 and the outlet nozzle or aperture 6.

The mineralization unit 7 is configured for accessing the disposable capsule 20 containing the mineralized fluid solution or powder M, for extracting the mineralized fluid solution or powder M from the capsule 20, and transferring the mineralized fluid solution or powder M from the capsule 20 to the water distributor 5. As a result, the device delivers to the container 10 a mix resulting from the mineralized fluid solution or powder with the predetermined amount of distilled water D. Preferably, albeit in a non-limiting extent, the mineralization takes place at room temperature or below the room temperature. For the purposes of the present disclosure, as "room temperature" shall be intended any temperature substantially ranging between 18° C. and 26° C.

Advantageously, any capsule 20 may be filled with a predetermined recipe of minerals, in such a way that once dissolved in the proper amount of water, a recipe of minerals substantially equivalent to a traditional bottled mineral water can be obtained. This way, the user may not feel any unpleasant taste in the water delivered by the device herein described; furthermore, the user may re-use the same container 10 for many times.

Applicant underlines that by choosing different recipes of minerals for the capsules 20, different types of mineralized waters can be obtained, i.e. a minimal mineralized water, or heavy mineralized water, and different tastes can be obtained. This way, the device according to the present disclosure may produce different types of mineral water at will of the user, simply by changing the type of capsule 20, i.e. by changing the mixture of minerals in the capsule.

The device according to the present disclosure not only allows the user to choose the particular recipe of minerals he wants to add to the water, but also helps reducing the overall environmental impact of distribution with respect to bottled mineral water.

In the course of the present disclosure, references "downstream" and "upstream" are used. The sense of the "stream" shall be intended from the inlet 3 to the distillation unit 2, then to a cooling unit (if present) and/or to a secondary or storage chamber (if present) then to a mineralization unit and/or to the water distributor.

The basic form of the distillation unit 2 substantially may assume the form of a vase provided with a bottom wall and a lateral wall defining a top opening from which in use the vapour can exit. In a preferred and non-limiting embodiment, the distillation unit 2 assumes the shape of a solid of revolution, e.g. with a circular section which identifies a longitudinal axis X. Provided that it shall be heated in use for allowing distillation, the material with which the distillation unit 2 is realized may comprise temperature resistant plastics, or should the case may be, metal. Having the distillation unit 2 at least partially realized in metal allows heating the water therein contained by means of electromagnetic induction.

In a particular and non-limiting embodiment, the distillation unit 2 may comprise an upper portion 2u and a lower portion 2l which can be separated from the upper portion 2u or, equivalently, which can be detachably connected thereto. Amongst the scopes for which the lower portion 2l could be designed as being detachable from the upper portion 2u is to allow the cleaning of the so inner cavity of the distillation unit 2, in particular for allowing cleaning and removing the solid residuals that rest after the water is fully distilled and the unit is left empty. The lower portion 2l may be coupled with the upper portion 2u by means of a threading 2t, which in a non-limiting embodiment is realized in an inner face of the lower portion 2l to match a corresponding counter-threading arranged on the outer face of the upper portion 2u. In any case the threaded coupling may be inverted, i.e. the threading 2t on the lower portion may be on the outer face of the lateral wall, while the counter-threading of the upper portion 2u may be on the inner face. The use of threaded coupling allows to withstand high pressures which may develop during the distillation.

In another non-limiting embodiment, whose technical features may be combined with any of those previously described, the distillation unit 2 may be provided with a bottom wall provided with a recess 2r; in case the distillation unit 2 has a shape of a solid of revolution, the recess 2r is centered on the longitudinal axis X, as depicted in FIG. 2. The recess 2r has a lateral wall which may be circular and be parallel to the longitudinal axis X, and a bottom wall which is substantially transversal, in particular orthogonal, to said axis. From the bottom wall a central prominent portion 2p substantially protrudes orthogonally with respect to the bottom wall itself, and defines or leaves an annular zone of the recess suitable to house at least a part of an heater 4, in particular an induction heater.

It has been disclosed above that the distillation unit 2 may be heated through an induction heater 4: in an embodiment, it can have a substantially circular shape at least partially surrounding the lateral wall of the distillation unit 2, and in particular may be arranged in correspondence of the bottom portion. If the distillation unit 2 is provided with the aforementioned recess 2r a first induction heater 4o may be arranged so that to at least partially surround the lateral wall of the distillation unit 2 and a second induction heater 4i may be arranged in the annular zone of the recess 2r. This way, heating of the water is optimized.

In a non-limiting embodiment, whose technical features may be combined with any of the technical features previously disclosed, the distillation unit 2 may be provided with a level sensor 2s, configured to allow so the detection of the amount of water present in the distillation unit 2; the level sensor 2s is preferably configured to provide in output a signal proportional to the level of the liquid in the distillation unit. The level sensor 2s may be a capacitive sensor or any other type of sensor suitable to detect a liquid level.

The distillation unit 2 is connected to the inlet 3 of the device through a direct connection or, in accordance to a particular embodiment, through an electrically and/or mechanically controlled valve 3v or through an inlet pump 3p, this latter being electrically controlled. This way, a controlled introduction of water into the distillation unit 2 can be realized. It may be noted that the device object of the present disclosure is preferably conceived to operate for distilling clean whitewater, albeit in a non-limiting embodiment a purifying filter may be provided upstream the inlet of the distillation unit 2 so has to have a pre-cleaning and/or for providing a reduction of bacteria, algae, and chemical contaminants which may affect the water at the inlet 3 of the device.

In a non-limiting embodiment, whose technical features may be combined with any of the technical features previously disclosed, at least part of the inner face of the distillation unit 2 may be realized in a bacteriostatic material, in particular in a bacteriostatic metal comprising silver or copper. This helps to reduce bacterial growth yet from the beginning of the introduction of water into the device. It may be noted that particles released from the metal, thanks to the distillation, would rest into the distillation unit 2 without affecting in a significant manner the amount of distilled water D produced by the unit itself.

Figure 6:
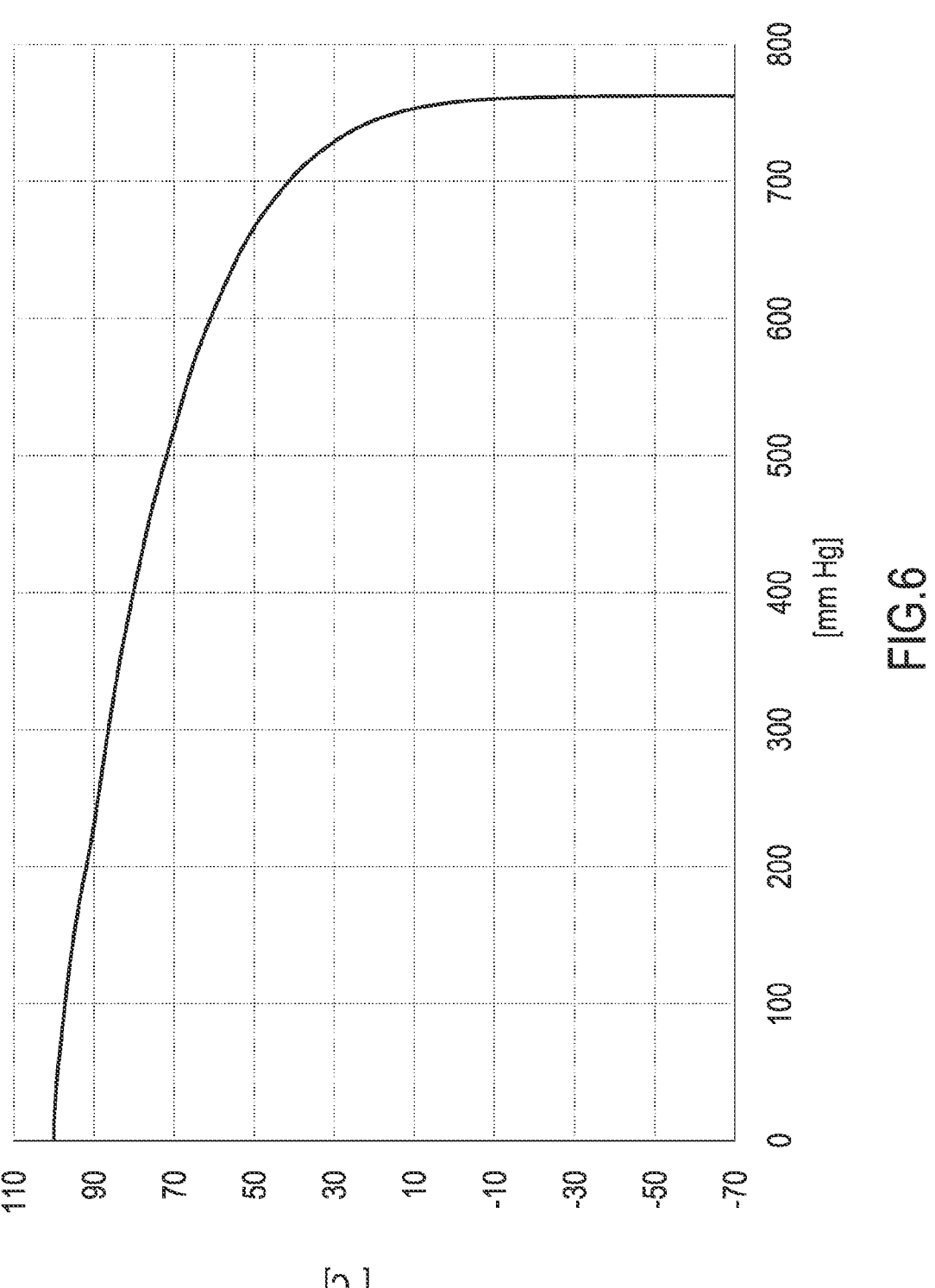
FIG. 6 shows a diagram concerning the evolution of the boiling point of water vs. pressure.

In a non-limiting embodiment, whose technical features may be combined with any of the technical features previously disclosed, the device 1 of the present disclosure may be configured to allow distillation under vacuum conditions; this means that at least the distillation unit 2 is a distillation unit specifically conceived to operate distillation of water at a pressure below the normal atmospheric pressure. Water boiling point is associated to the pressure by means of an established law resulting in the graph representing the water boiling point vs. pressure of FIG. 6. Reduction of pressure at least within the distillation unit 2 allows for providing the distillation of water at a lower temperature, thus requiring injection of less amounts of heat, saving a part of the energy required for heating. For this purpose, the distillation unit 2 may be provided with a vacuum port, preferably but in a non-limiting extent positioned in the top portion thereof so as to be left outside the top level of the water. In a non-limiting embodiment, the vacuum port is connected to a vacuum pump, identified in FIG. 4 with the reference number 16, whose purpose is to provide vacuum within the distillation unit 2 for at least the time required to perform the partial, preferably the complete, distillation of the water contained in the distillation unit 2, i.e. for letting this last be fully emptied.

In a particular configuration of use, the vacuum created within the distillation unit 2 by means of the vacuum pump 16 may be still used to facilitate the introduction of a further predefined amount of water within the distillation unit 2, in such a way to allow reducing the effort required by the inlet pump 3p if present. In a particular embodiment, the vacuum pump 16 may be an occluding vacuum pump: this way, once stopped, there is no need to further close any valve to prevent air enter back into the distillation unit 2.

Figures 4, 5:
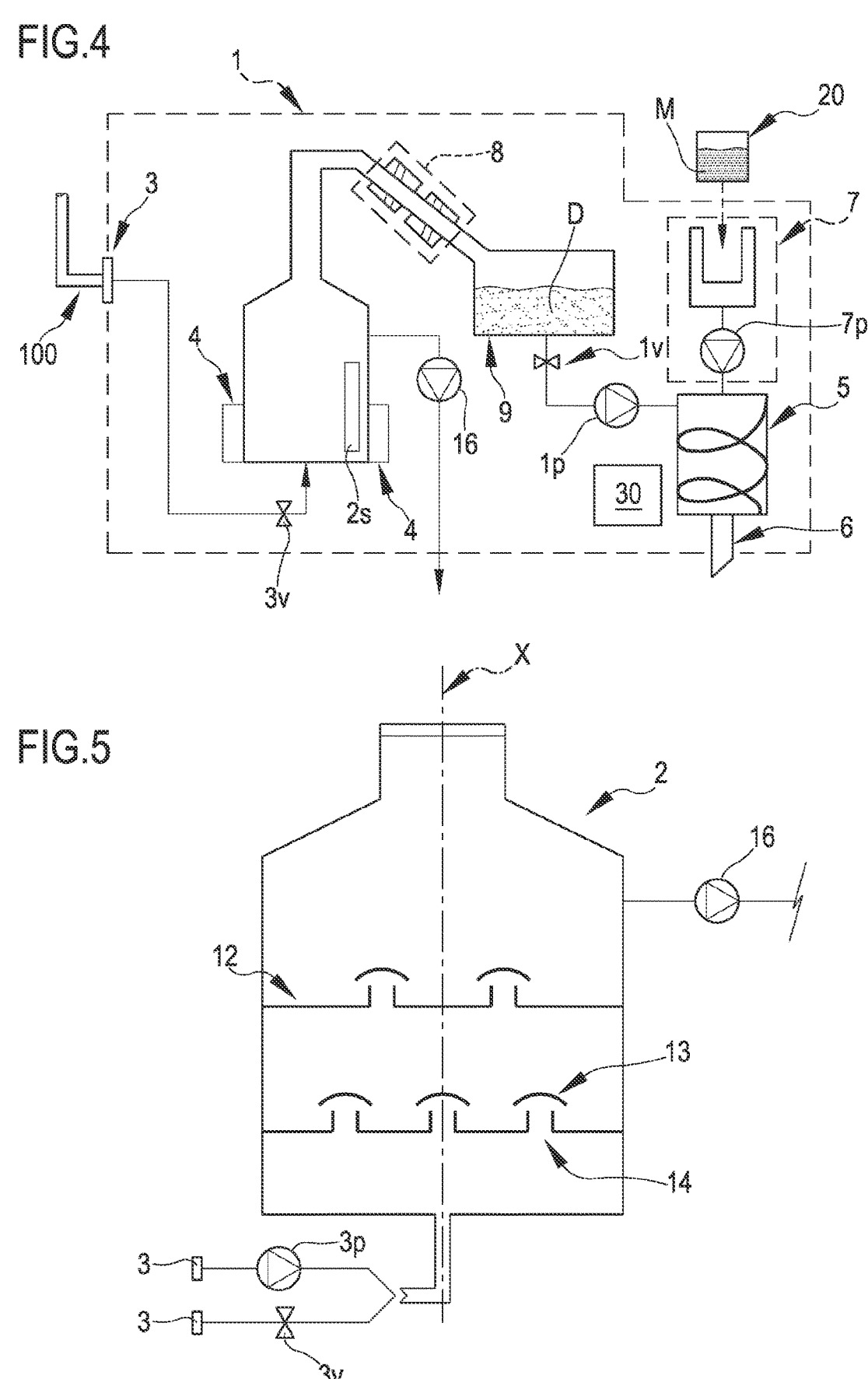
FIG. 4 shows another embodiment of the device according to the present disclosure.
FIG. 5 shows a section view of an embodiment of the distillation unit of the device.

FIG. 5 shows a particular configuration of the inner cavity of the distillation unit 2, which may be applied for any alternative disclosed in the present document, i.e. in particular for the case of distillation at atmospheric pressure and for the case of distillation under vacuum condition. The cavity of the distillation unit 2 may be provided with at least one and preferably a plurality of trays 12 or plates, whose purpose is to force the vapour pass into the cavity up to the top aperture of the distillation unit 2 in a curved, non-straight, path, in particular a path wherein for at least a portion thereof the direction of the vapour shall be sensibly distinguished from the direction identified by the longitudinal axis X. In a particular configuration, the distillation unit 2 is provided with several trays 12 arranged at different heights, each one identifying at least one passage 14 for letting the vapour move from a lower height with respect to the tray or plate to an upper height with respect to the tray or plate, and optionally this passage is provided with a domed structure 13 arranged in substantial correspondence thereof and in particular in an axial alignment thereto. The domed structure helps the forcing of a flow curved path. When at least one, preferably a plurality of, tray/s 12 is present, the distillation unit 2 may assume the configuration of a plate column or tray column.

As stated before, the device object of the present disclosure may be provided with a cooling unit 8, arranged downstream the distillation unit 2, and configured for allowing the condensation of the distilled water vapor. In a particular embodiment the cooling unit 8 may comprise a portion of conduit with at least one and preferably a plurality of Peltier cells arranged on the outer surface thereof. The Peltier cell may be alternatively substituted with any actively fed cooler, that may be fed with electric power or with a cooling fluid or gas. Preferably, albeit in a non-limiting extent, the portion of conduit may be of a heat conductive metal, e.g. surgical stainless steel, for the purpose of providing a good thermal conductivity together with avoiding unwanted release of substances from the metal which may otherwise contaminate the distilled water. This conduit preferably exits on a secondary chamber identified by the reference number 9, whose purpose is to store or collect the predetermined amount of distilled water D, which will be further subjected to mixing as already anticipated. In an embodiment, the cooling unit 8 may be provided with the secondary chamber; in this latter case, the actively fed cooler may be arranged so at to at least partially surround the lateral surface and/or to at least partially surround the lower surface of the secondary chamber. Otherwise, the cooling unit 8 may not be present as a separate component and may be integrated directly in the secondary chamber.

It shall be noted that in case the distillation takes place in vacuum condition, the assembly formed by the distillation unit 2, the cooling unit 8 and the secondary chamber 9 may operate, at least temporarily, in a vacuum condition, therefore forming—yet at least temporarily—a single confined environment whose inner cavity is subject to a pressure which is lower than the atmospheric pressure.

It may be noted that a first unidirectional and/or non-return valve may be optionally present on the outlet of the distillation unit 2 and/or a second unidirectional and/or non-return valve may be optionally present on the outlet of the cooling unit 8 or of the storage chamber 9. The direction allowed by the valve is such that to allow, after a predetermined pressure level is achieved upstream the valve itself, the flow from the distillation unit 2 to the cooling unit 8 and/or to the secondary chamber, and/or to the water distributor 5; the valve impedes anyway the flow in the reversed sense.

In a non-limiting embodiment, the secondary chamber 9 may be provided with an outlet connected with an electrically and/or mechanically controlled valve $1v$ or with a delivery pump $1p$, for the purpose of forcing the extraction of the predetermined amount of distilled water D from the secondary chamber 9 to force it get introduced into the water distributor 5.

The water distributor 5 is provided with a first inlet connected to the secondary chamber 9 (if the case may be to the delivery pump $1p$ and/or to the electrically and/or mechanically controlled valve $1v$) and with a second inlet connected to the mineralization unit 7. The water distributor 5 is configured to mix simultaneously the predetermined amount of distilled water D from the secondary chamber 9 with the mineralized fluid solution or powder M coming from the capsule 20 opened through the mineralization unit 7, in particular performing the mixing in accordance to said predetermined ratio. Emptying of the capsule 20 preferably is performed progressively with the progressive emptying of the secondary chamber 9 so that homogeneous mixing is thus obtained. It shall be noted that the desired ratio may be a fixed desired ratio or (optionally) a variable desired ratio, and may be defined or otherwise controlled by adapting the operation of the delivery pump $1p$ with respect to a mineralization pump $7a$ which may be conveniently provided in the mineralization unit 7 upstream the second inlet. Should the ratio be variable, in a non-limiting embodiment this ratio may be electronically set through the input of a predetermined command or data to a control unit.

Having pumps with controllable operation in terms of flow rate and/or operation timings allow for having a device which may be configured to deliver the right amount of mix ratio over several container 10 capacities. By changing the container capacity 10 also the predetermined amount of water to be loaded in the distillation unit 2 variates proportionally, and so takes place for the capacity of the capsule 20 (or at least for the amount of mineralized fluid solution or powder M extracted therefrom). Should this technical feature be optionally present on the device 1, the user may advantageously select the capacity of the container 10 through a user interface, letting a control unit 30 so properly select the right amounts of water to be loaded and further allowing it properly choose the signal to send to the various pumps of the device in order to have the right mix ratio and the right overall amount of mineralized water introduced in the container 10. It may be noted that a fixed ratio of mixture may be provided with proper selection of flow rates for a couple of injecting nozzles arranged in correspondence of each of the two inlets of the water distributor.

The water distributor 5 is provided with a particular shape so that to spray and/or micronize or nebulize the predetermined amount of water with the predetermined amount of mineralized fluid solution or powder M, so that to obtain a uniform mixing of these two components, preferably with a spiral path.

Figures 7, 8, 9:
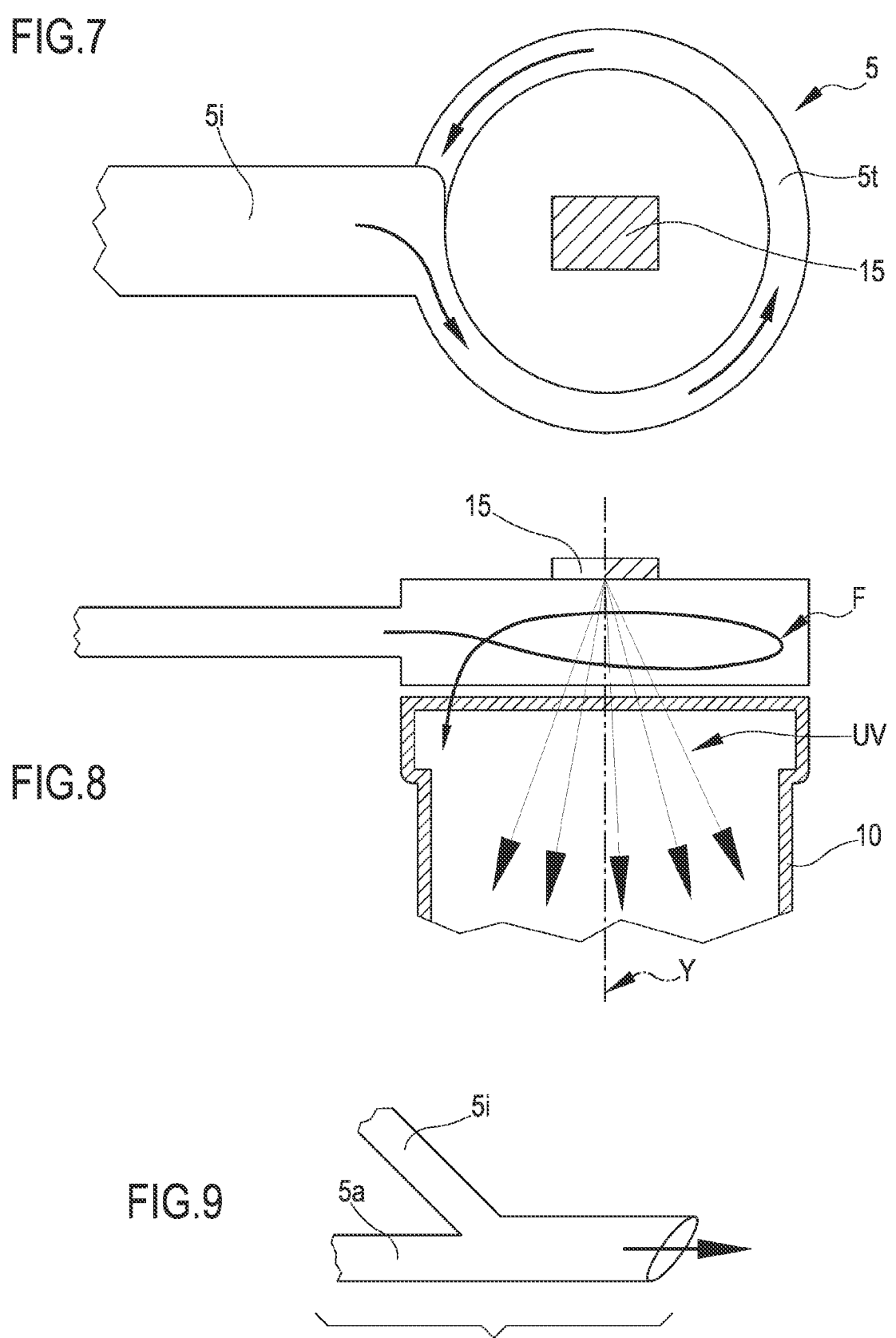
FIG. 7 shows a plan view of a particular embodiment of the water distributor according to the present disclosure.
FIG. 8 shows a lateral view of the water distributor of FIG. 7.
FIG. 9 shows another non-limiting embodiment of a water distributor in accordance to the present disclosure.

In a particular albeit non-limiting embodiment, the device object of the present disclosure is provided with a sterilization device which is in particular an UV sterilizer 15, whose purpose is to allow sterilization of at least part of the container 10 and/or of the mix of distilled water and mineralized fluid solution. In a particular embodiment, the UV sterilizer 15 is configured for allowing simultaneous sterilization of at least part of the container 10 and of the mix of distilled water and mineralized fluid solution. The Applicant has conceived a particular configuration of the water distributor 5 provided with an annular distributing portion $5t$, which in use opens on the neck of the container 10; the annular distributing portion defines a central opening axially aligned along a distribution axis (identified in FIG. 8 as axis Y) which joins the central axis of the container 10 with the center of the opening of the water distributor 5. Here the mix of the distilled water and mineralized fluid solution or powder reaches the annular distributing portion $5t$ from a lateral conduit $5i$ substantially arranged orthogonally with respect to the distribution axis Y, and then rotates circularly (see arrow F of FIG. 8) before entering into the container 10. The UV sterilizer 15 is configured for directing at least part of the UV radiation substantially in a direction such that it can reach the bottom of the container 10. While the water distributor 5 sprays the mix of distilled water and mineralized fluid solution or powder M into the container 10, the sprayed mix is also radiated with the UV radiation, and thus simultaneous sterilization as above disclosed is achieved. Thanks to this technical aspect, the device object of the present disclosure can perform distillation and sterilization of drinkable water according to two different principles (thermal distillation, radiation sterilization).

It may be noted that another simpler type of water distributor 5, in accordance to FIG. 5, may be realized as a simple two-inlet conduit, e.g. a "Y" or "T" shaped conduit, wherein a first inlet port $5a$ is connected to the distillation unit 2, optionally through the secondary chamber 9, and/or through the delivery pump $1p$.

FIGS. 10 and 11 disclose various configurations of the mineralization unit 7 configured to extract an amount of mineralized fluid solution or powder M from the capsule 20. According to FIG. 10 the mineralization unit 7 comprises a puncturing element $7a$ in the form of a needle which can be axially moved from a first position wherein its puncturing end is distanced from the capsule 20 and a second position wherein its puncturing end lies within the capsule 20 after having perforated at least a portion thereof. In a preferred and non-limiting embodiment, the motion of the puncturing element $7a$ may be axial (see arrow W in FIG. 10 identifying the axial motion of the puncturing element $7a$). The mineralization unit 7 may comprise a frontal retaining wall $7r$ provided with recesses suitable to copy or trace at least part of the form of the capsule 20 so as to retain it, at least temporarily, in a proper opening position at which it can be perforated. It may be noted that the capsule 20 may be provided with a weakening portion provided with an.

FIG. 11 shows another embodiment of the mineralization unit 7, comprising an opening element $7s$ configured to extract the mineralized fluid solution or powder M from the capsule 20 without direct perforation. In this case the opening element $7s$ may be conveniently provided with a sealing ring contacting a lateral wall $20p$ of the capsule 20 in correspondence of a valve $20v$ thereof. The extraction of the mineralized fluid solution or powder M from the capsule may be performed in this latter case by means of vacuum extraction. The valve $20v$ arranged on the lateral wall $20p$ of the capsule 20 may be conveniently configured to open outwardly and may be conveniently realized in a form of a duckbill valve. Also in this embodiment the opening element $7s$ may be realized so as to be axially moved from a first position wherein it is distanced from the capsule 20 and a second position wherein it lies in substantial contact with the lateral wall $20p$ of the capsule 20.

In a particular and non-limiting embodiment, the capsule 20 may be provided with an auxiliary aperture $20a$ configured to allow the introduction of air (or any other suitable gas, e.g. carbon dioxide or nitrogen) and/or fluid into the inner cavity of the capsule 20. The introduction may be a forced introduction (through actively fed elements like e.g. a pump) or otherwise may be a free introduction, e.g. indirectly caused by suction which takes place at the first aperture. In an embodiment, the auxiliary aperture 20a may be arranged in a position opposed to that of the valve 20v. When this embodiment of the capsule 20 is used, it may be convenient to have the mineralization unit 7 configured to open or puncturing the capsule:

in correspondence of a first position, e.g. the position wherein the valve 20v is present, by means of the opening element 7 or the puncturing element 7a, and in correspondence of a second position, e.g. the position at which the auxiliary aperture 20a is present, preferably by means of auxiliary puncturing and/or opening means.

In particular, water and/or air may be forced into the inner cavity of the capsule 20 by means of the mineralization unit 7, so that to help to achieve a full emptying. Thus through the mineralization unit 7 may be realized a process of accessing the capsule 20 wherein extracting the mineralized fluid solution or powder M from the capsule 20, or emptying the disposable capsule 20 from said mineralized fluid solution or powder M is performed by accessing the capsule 20 in correspondence of a first position, optionally in correspondence of a first aperture, at which the mineralized fluid solution or powder M is extracted from the capsule 20 and by means of accessing the capsule 20 in correspondence of a second position, optionally in correspondence of an auxiliary aperture 20a, wherein in correspondence of the second position fluid, in particular water, and/or air or any suitable gas, is forced (through active feeding elements) or otherwise freely allowed to enter into the inner cavity of the capsule 20 wherein the mineralized fluid solution or powder M is contained. Water flowing through the auxiliary aperture 20a may be at least part if not all the distilled water D extracted from the distillation unit 2. In other words, the so mineralization unit 7 may be configured to receive part of the distilled water which is produced by the distillation unit 2 and make it pass or flow into the capsule 20 before reaching the water distributor 5. It may be noted that this process may be convenient especially when dealing with a powder, and in particular when a fluid is forced or allowed to enter the inner cavity of the capsule 20, since a sort of washing is performed in the inner cavity, with the result that all the relevant powder is extracted.

The Applicant observed that obtaining a particular efficiency for the device 1 may be enhanced by realizing the capsule 20 in such a way that minimal residual of mineralized fluid solution or powder M rests after the extraction by means of the opening element 7s or puncturing element 7a: in particular it would be preferably that no residual of mineralized fluid solution or powder M rests in the capsule 20 after the extraction by mans of the opening element 7s or puncturing element 7a. Thus, in a particular embodiment of the device, the capsule 20 is configured, by means of mechanical construction of its inner cavity or by spatial orientation at least once properly installed in the mineralization unit 7, so that to allow removal of substantially all the mineralized fluid solution or powder M. For example, as schematically represented in FIG. 13, the capsule 20 may be provided with an inner cavity 20 realized substantially with a rounded, hemispheric end and, once in the mineralization unit 7, the capsule shall be oriented in such a way that the hemispheric end lies on the bottom of the cavity 20c; in use, with the progressive extraction of the mineralized fluid solution or powder from the capsule 20, the level into the cavity reduces and the mineralized fluid solution or powder M rests in the hemispheric end, thus in areas of a progressively reduced diameter up to the end axial bottom point of the hemispheric end at which no fluid solution remains. It shall be noted that in this case the puncturing element shall substantially contact the lowest portion of the hemispheric end of the capsule.

In another embodiment, which is represented in FIG. 14, the capsule may have an inner cavity with a tapering 20t in correspondence of the lateral wall 20p, and in use, once introduced into the mineralization unit 7, the tapering 20t lies in the lowest part of the capsule. This particular configuration of the inner cavity may be particularly convenient if combined with an opening element 7s extracting by vacuum the mineralize fluid solution or powder M, as previously disclosed.

In any case, the capsule object of the present disclosure may be provided with an inner cavity 20c under pressure or, on the contrary, at atmospheric pressure. It may be noted that for reasons of easiness of compliance with shipments regulations, pressure that may be present in the inner cavity of the capsule 20c may be lower than the threshold that standard define for taking particular care for pressurized vessels.

Applicant has further noticed that for easiness of use the capsule 20 may be provided with an outer shape configured for allowing the introduction in the mineralization unit 7 only in the correct way. This helps reducing the risk of damaging the mineralization unit 7 or the risk of opening or perforation of the capsule at the wrong position. In one embodiment the capsule 20 may be realized so as to have a shape of a substantial rectangle having lateral walls 20p arranged principally according to a first direction A and according to a second direction B orthogonal to the first direction A; the sides according to the first direction have a length l1 which differs from the length l2 of the sides arranged according to the second direction; an edge joining a side arranged according to the first direction A with a side arranged according to the second direction B is provided with a tapering 20R so as to result in a substantial small fifth side arranged obliquely with respect to both said first and said second directions. In another embodiment this effect may be achieved by a combination of the shape of the slot 7a on the case of the device 1 together with the outer shape of the capsule 20 itself.

In a preferred albeit non-limiting embodiment, the device object of the disclosure may be provided with a control unit 30, configured to control the operation of the device itself and in particular configured to cause the loading of a predetermined amount of water to be distilled into the distillation unit: this loading may be performed by means of an appropriate signal sent to the electrically and/or mechanically controlled valve 3v or to the inlet pump 3p. Stopping the pump 3p or closure of the valve 3v may be performed by means of the reception of an appropriate signal from the level sensor 2s, if present, or after a predetermined amount of time. The control unit 30 may be further configured to cause the activation of the heater 4 for an amount of time sufficient to cause the distillation of at least a part of the water contained into the distillation unit 2, in particular the whole content of water contained in the distillation unit 2. Complete voiding of the distillation unit 2 may be checked through the level sensor 2s if present, or otherwise the control unit 30 may be configured to deactivate the heater 4 after a predetermined amount of time.

In a preferred and non-limiting embodiment, the control unit 30 may be configured to control the activation of the vacuum pump 16 so as to realize vacuum within the distillation unit 2. In particular the control unit 30 may be configured to operate a step of activation of the vacuum pump 16 only after the completion of the filling of distillation unit 2 from the inlet 3 up to a predetermined level corresponding to the predetermined amount of water to be distilled. Appropriate vacuum may be checked through a pressure sensor connected to the control unit and sensing pressure into the distillation unit 2 or indirectly, by activating the vacuum pump 16 for a predetermined amount of time. It may be noted that activation of the heater 4 shall be performed after the completion of the vacuum creation into the distillation unit 2; thus the control unit 30 may be configured to cause the activation of the heater 4 through the sending of an appropriate signal only after the completion of the step of vacuum creation into the distillation unit 2, i.e. only after the stopping of the vacuum pump 16.

The control unit 30 may be configured to control the activation of the cooling unit 8 to cause the condensation of distillation vapour outside the distillation unit 2, obtaining a predetermined amount of distilled water ID, the activation of the cooling unit 8 is preferably performed automatically at the moment of activation of the heater 4, and the deactivation of the cooling unit 8 takes places simultaneously or immediately after the deactivation of the heater 4.

The control unit 30 may be further configured for controlling the operation of the mineralization unit 7, in particular controlling the motion of the extraction so element 7s or of the puncturing element 7a, and for controlling the subsequent activation of the mineralization pump 7p, after the extraction element 7s has contacted the lateral wall 20p of the capsule 20 and/or after the puncturing element 7a has entered into the inner cavity of the capsule 20. Preferably the activation of the mineralization pump 7p is simultaneous with the activation of the delivery pump 1p in order to allow appropriate, correct and simultaneous mixing of the predetermined amount of distilled water D with the mineralized fluid solution or powder M.

In case the device 1 is so provided, the control unit 30 may be further configured to activate the vibrator 11 and/or ultrasonic source, preferably in one of the following conditions: during the step of distillation of the water, i.e. for the same time of activation of the heater 4, or in an intermediate step, after the de-activation of the heater 4, and before, for example, the activation of the delivery pump 1p.

In case the device 1 is provided with a UV sterilizer 15, the control unit 30 may be configured to activate it at least for the time sufficient to distribute the predetermined amount of distilled water D fully into the container 10 together with the mineralized fluid solution or powder M. In a non-limiting embodiment, the UV sterilizer 15 may receive an activation signal from the control unit 30 before the activation of the mineralization pump 7p and of the delivery pump 1p. This way, radiation of the container 10 is obtained also before any introduction of fluid therein, thus providing a temporary direct radiation of at least a partial portion of the inner surface of the cavity of the container 10 before the introduction of the water. Thanks to this aspect, a better safety is obtained for the water distributed to the container 10, since for an appropriate safety of drinking it may be convenient that also the container 10 is sterilized.

The control unit 30 may be a general purpose processor specifically configured to execute one or more of the aforementioned operations, in particular through the execution of a predetermined software or firmware program, or otherwise it may be a specific-type processor, e.g. an ASIC, or an FPGA provided with a specific software program. The control unit 30 may be provided with a single core or multi core processor, and may be provided with so a memory, in particular a non-transitory memory, suitable to store the aforementioned program and/or for example one of the predetermined time values for controlling any of the delivery pump 1p, inlet pump 3p or electrically and/or mechanically controlled valve 3v, mineralization pump 7p, and/or for storing the threshold levels or magnitudes of the signals provided by the pressure sensor or liquid sensor 2s, and/or for setting the appropriate time to activate the UV sterilizer 15. The memory support may be physically provided within or outside the control unit 30 and/or the device 1, and may be in particular a remote memory accessible to a data connection logic channel; in particular, the memory may be a "cloud" memory. The control unit 30 may be further provided with interface system to send and receive signals from a user interface of the device 1 not represented in the annexed figures, and/or for allowing the transmission and reception of signals and controls from/to a remote portable device of the user, preferably over a wireless channel.

It may be further noted that the device object of the present disclosure may be configured to cause the transferring or motion of the capsule 20 from the mineralization unit 7 to a collection space below a hopper 7h. This provided for avoiding the need of manually extracting each capsule 20 after the use. In general terms, the mineralization unit 7 may comprise a movable equipment provided with a retaining wall 7r and configured to limit the movement of the capsule 20, and is configured to cause the falling of the capsule 20 in a hopper 7h after the opening thereof as a result of a relative motion between the mobile equipment and the capsule 20. The mineralization unit 7 is configured to retain the capsule 20, preventing its falling into the hopper 7h before the opening performed with the motion of the movable equipment. In an embodiment, the hopper 7h opens in a collection space which may be part of drawer, accessible from the outer part of the case of the device 1. This way the used capsules may be conveniently extracted from the device 1 to be finally thrown away or recycled.

In an embodiment, the movable equipment moves between a first position and a second position. The mineralization unit 7 is further provided with a supporting wall 7b, optionally arranged axially opposed to the movable equipment; the distance between the supporting wall 7b and the movable so equipment is that the capsule 20 at the moment of its introduction into the mineralization unit 7 rests trapped or caught between the mobile equipment and the supporting wall 7b when the mobile equipment is in the first position, and is forced to fall into the hopper 7h after the movable equipment is moved from the second position back to the first position.

Figures 16, 17:
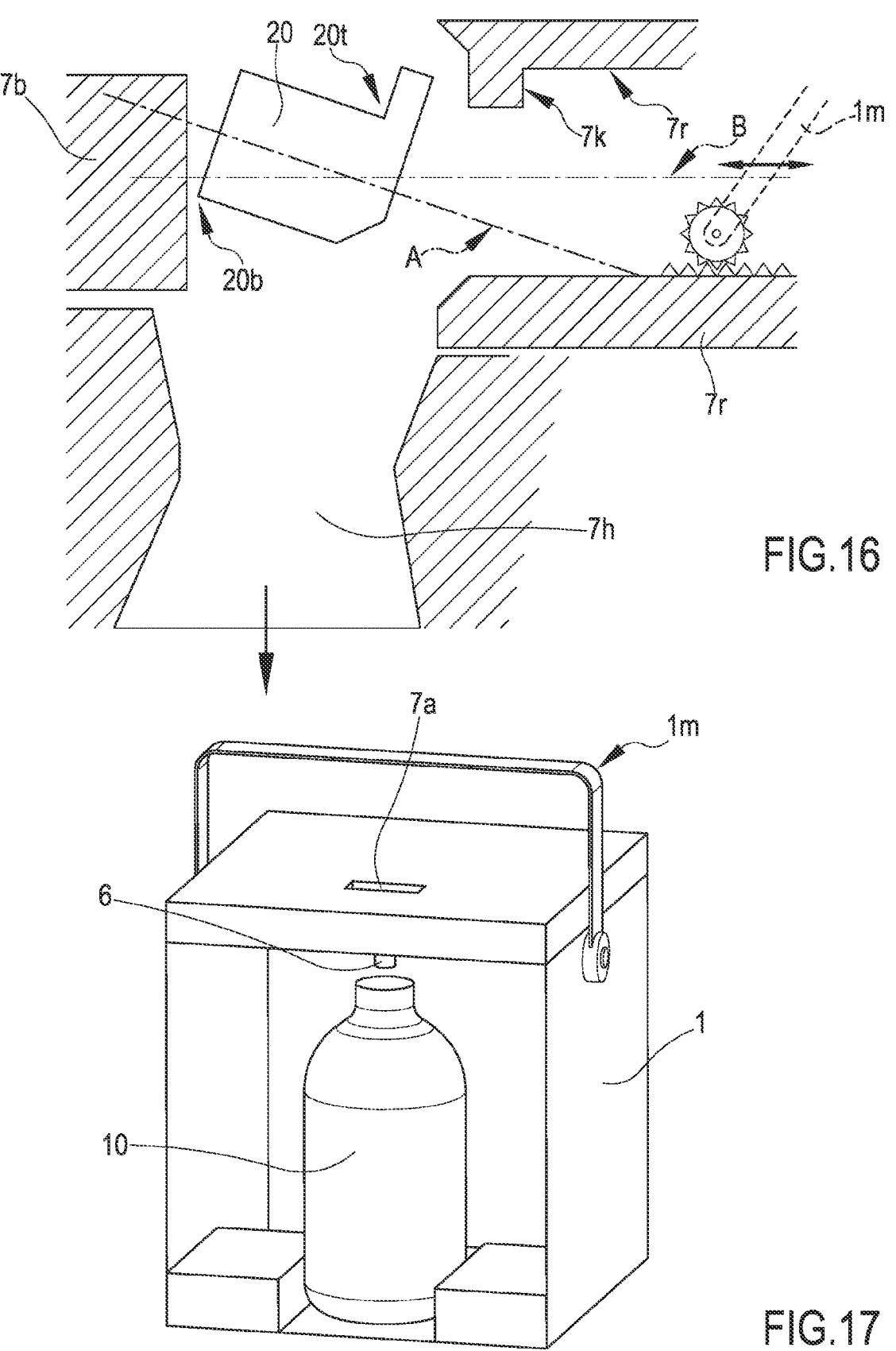
FIG. 16 shows a detail of a partial section view of a mineralization unit being part of the device object of the present disclosure.
FIG. 17 shows a schematic perspective view of a device object of the present disclosure provided with an actuating lever.

In particular the retaining wall 7r realizes a wall against which the capsule strikes at least at the moment of the introduction into the mineralization unit 7. The retaining wall 7r defines a housing or a recess suitable to house at least a part of the capsule 20. As shown in FIG. 16, the capsule 20 enters the mineralization unit 7 so that to be axially offset and inclined with respect to the axis B of the housing or recess defined by the retaining wall 7r. The wall is provided with a tooth 7k in the front part, which is configured to engage with a front tooth t7 of the capsule 20. During the motion of the movable equipment from the first position to the second position the capsule is forced to reduce progressively the offset and inclination of the axis A to get partially into the housing resulting substantially axially aligned with the axis B. The back part of the capsule, identified with the reference number 20b, strikes against the back wall 7b of the mineralization unit. When the movable equipment is moved back from the second to the first position, the back part 20b of the capsule 20, though the retention provided by the tooth 7k gets progressively distanced from the back wall 7b with the result of tend to fall into the hopper 7h from the back part. When a sufficient distance is created, the back part of the capsule 20 no more contacts the back wall 7b of the mineralization unit 7 with the resulting falling into the hopper 7h.

In an alternative embodiment the tooth 7k of the retaining wall and the tooth 20t of the capsule 20 may be substituted by a gripping ring (not represented in the annexed figures) which may be conveniently disposed on the outer face of at least part of the lateral wall of the capsule, said gripping ring being configured to cause the forcing of the separation of the back part 20p of the capsule from the back wall 7b of the mineralization unit 7 after the capsule 20 has been opened as already described.

The mineralization unit 7 can be provided with a kicker or pushing element, which is configured to force the extraction of the capsule from the so retention wall 7r and/or to help the removal of the capsule from the contact to the back wall 7b. The kicker or pushing element may be moved between a first position at which it does not contact the capsule 20 and a second position at which it contacts the capsule 20. The motion between the first and the second position is such that the capsule 20 is hit by the kicker or pushing element with a force sufficient to allow its removal from the previously kept position so that to cause the capsule fall into the hopper 7h.

Figure 18:
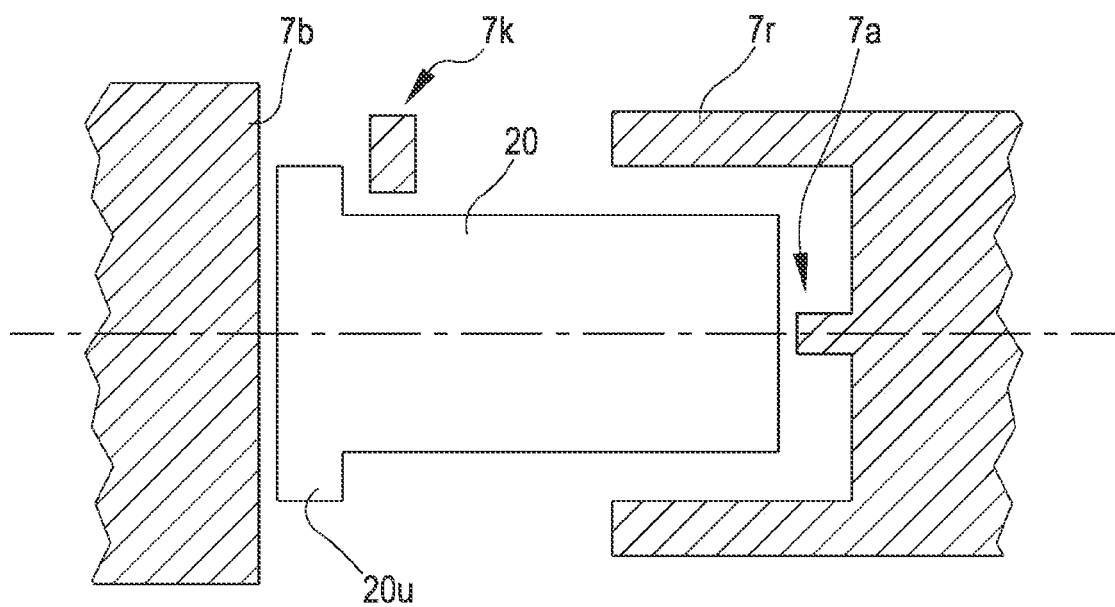
FIG. 18 shows a schematic top view of a non-limiting embodiment of the mineralization unit part of the device object of the present disclosure.

In another embodiment, which is represented in FIG. 18 (seen from the top), the configuration of the mineralization unit 7 is that a tooth 7k may be provided not on the retaining wall of the movable equipment but, in contrast, in a fixed portion of the mineralization unit 7, protruding into the cavity that allows housing the capsule 20. In an embodiment the capsule 20 may be provided with a back ring 20u protruding from the lateral wall of the capsule. The back ring 20k is arranged in correspondence of one end portion of the capsule itself, to that to be provided with a rear face which substantially defines also the rear face of the capsule. Should the capsule 20 be realized with a cylindrical shape, the back ring 20u diameter is substantially greater than the diameter of the rest of the body of the capsule. The diameter of the outer ring is such that the capsule engages the tooth 7k only at a height substantially corresponding to the housing overall defined by the retention wall 7r of the movable equipment. As represented in FIG. 18, the back ring 20u of the capsule lies substantially between the back wall 7b and the tooth 7k.

In use, when the movable equipment moves from the first position to the second position, forces the rear face of the back ring 20u against the back wall 7b of mineralization unit. Once the puncturing element 7a or the opening element opens or anyway enters into the capsule, when the movable equipment is than moved back from the second to the first position, this puncturing element or opening element exerts a retention force, optionally together with the retention wall 7r (e.g. due to a partial dilation of the body of the capsule which may be caused by forcing the inlet of gas or water from the auxiliary opening 20a). This retention force is sufficient to distance a bit the back ring 20u from the back wall 7b of the mineralization unit 7, and to cause the back ring 20u strike against the tooth 7k. Prosecution of the stroke of the so movable equipment to the first portion cause the complete detachment of the capsule 20 from the housing realized by the retention wall 7r and allows the capsule to fall by gravity, should the case may be with the help of the kicker, down to the hopper 7h. In this latter case the process of extraction of the mineral fluid solution or powder M from the capsule 20 involves distancing the movable equipment from the capsule and/or moving the movable equipment from the second position back to the first position so that as a result of this motion the capsule 20 gets distanced from the back wall 7b and the back ring 20u strikes against the tooth 7k while partially following the sense of the stroke of the movable equipment from the second position back to the first position, e.g. as a result of a retention force which is performed by the puncturing element in extraction from the capsule. This results in a complete removal of the capsule from the housing realized by the retention wall. A step of providing a further help in this removal may be present, and may be carried out with the help of the aforementioned kicker. As a final result, this causes the fall of the capsule 20 into the hopper 7h.

As represented in FIG. 17, it may be finally noted that the device 1 object of the present disclosure may be conveniently provided with an actuating mechanism 1m which is configured at least to be moved between a first position or configuration and a second position or configuration. In the first configuration, the mechanism allows the introduction of the capsule 20 into the mineralization unit and optionally allows also the capsule fall into the hopper 7h after being opened. In an embodiment the second configuration corresponds to the configuration wherein the movable equipment of the mineralization unit 7 is in the first position. In the second configuration, the mechanism allows the opening, the case may be the perforation, of the capsule 20. The actuating mechanism 1m may be provided with an electric motor acting on the movable equipment, or on the contrary may be fully manual and/or may be provided with lever that the user may directly contact or grasp, the lever acting on the movable equipment e.g. by means of a bevel mechanism or a toothed wheel-rack coupling: in particular in this latter case the lever or handle may be provided with the toothed wheel while the movable equipment may be provided with the rack, as schematically represented in FIG. 16.

The invention is not limited to the embodiment/s illustrated in the drawings. Accordingly, it should be understood that where features mentioned in the appended claims are followed by reference signs, such signs are included solely for the purpose of enhancing the intelligibility of the claims and are in no way limiting on the scope of the claims.

Finally, to the object of the present disclosure, additions or variation obvious to a person skilled in the art may be carried out, without for this departing from the scope of protection provided by the annexed claims.

The invention claimed is:

1. A device for distributing mineralized water, said device comprising:

an inlet, for loading water from an external source;

a distillation unit, connected to the inlet and configured to provide a distillation of an amount of water at least partially through heating, wherein said distillation unit in turn comprises, or is operatively connected to, at least a heater configured for providing heat in an amount sufficient to heat the amount of water at least up to a boiling temperature;

a water distributor configured for transferring a predetermined amount of distilled water extracted from the distillation unit, to a removable container, the water distributor being provided with an outlet nozzle or aperture configured to introduce said distilled water from said water distributor into said container;

a mineralization unit interposed between the distillation unit and the outlet nozzle or aperture, said mineralization unit being configured for accessing an inner cavity of a disposable capsule, containing a mineralized fluid solution or powder in said cavity, for extracting at least part of said mineralized fluid solution or powder from said disposable capsule and transferring at least part of said mineralized fluid solution or powder from the capsule to the water distributor;

the device, being configured to mix the mineralized fluid solution or powder with the predetermined amount of distilled water transferred by the water distributor to the removable container;

said distillation unit being a vacuum distillation unit, configured to carry out the distillation of the water at a pressure below an atmospheric pressure;

said device comprising a vacuum pump having an inlet connected to the distillation unit and suitable to provide vacuum at least in said distillation unit, said vacuum pump being configured to extract at least a portion of air contained in the distillation unit;

wherein the distillation unit is provided with a bottom wall whose shape defines a recess, at least part of said bottom wall protruding in said recess, and defining an annular zone of the recess suitable to house at least a part of the heater.

2. The device according to claim 1, wherein said device is configured to mix said predetermined amount of distilled water transferred by the water distributor to the removable container, with said mineralized fluid solution or powder in a ratio, defined as the predetermined amount of mineralized fluid solution or powder over said predetermined amount of distilled water, less than one (1), the device being configured to mix the mineralized fluid solution or powder with the predetermined amount of distilled water and wherein said water distributor is configured to distribute said mineralized fluid solution or powder and said predetermined amount of distilled water mixed together through said outlet nozzle or aperture, the device further comprising a cooling unit interposed between the distillation unit and the mineralization unit, the cooling unit being configured to cool down water exiting from the distillation unit and/or for allowing condensation thereof, said cooling unit optionally comprising at least one actively fed cooler.

3. The device according to claim 1, wherein:

the distillation unit is provided with an upper portion and a lower portion detachably connectable to the upper portion, optionally through a screw threading arranged on the lateral walls of the upper portion and of the lower portion;

and/or the distillation unit is provided with at least one wall defining an inner cavity suitable to house liquids, said at least one wall having an inner face facing said cavity, said inner face comprising a bacteriostatic material, optionally a bacteriostatic metal comprising silver and/or copper, and/or wherein the distillation unit is provided with a vibrator and/or ultrasonic source, to remove distillation particles or residuals from an inner face of said distillation unit, and wherein the distillation unit is provided with a plate column or tray column, comprising at least one plate or tray arranged in the inner cavity and defining at least one passage of a reduced size between a lower zone of the cavity arranged below the plate or tray and an upper zone of the cavity above the plate or tray, the plate column or tray column forcing a passage of said vapor in a curved path before exiting the distillation unit.

4. The device according to claim 1, wherein the heater is an induction heater, optionally being at least partially circularly surrounding a lateral wall of the distillation unit or being arranged substantially underneath a bottom portion of the distillation unit, and wherein the heater is provided with a first outer ring at least partially circularly surrounding the lateral wall of the distillation unit and with a second inner ring arranged in the annular zone of the recess.

5. The device according to claim 1, wherein the device comprises at least one delivery pump or electrically and/or mechanically controlled valve arranged downstream an outlet of the distillation unit and optionally upstream the water distributor;

the delivery pump being configured to cause the forcing of liquid flow into the water distributor.

6. The device according to claim 1, wherein the water distributor comprises at least a first inlet port connected to the distillation unit and a second inlet port connected to the mineralization unit, optionally wherein the first inlet port is connected to the distillation unit through a cooling unit and/or through a storage chamber and wherein the water distributor is configured to provide a vortex mixing of the distilled water with the mineralized fluid solution or powder extracted from the capsule before they pass through the outlet and wherein the mineralization unit comprises a mineralization pump configured to force extraction of the mineralized fluid solution or powder from the capsule and to provide injection of the mineralized fluid solution or powder extracted from the capsule into the second inlet of the water distributor.

7. The device according to claim 1, further comprising a UV sterilizer configured to allow sterilization of at least a part of said removable container when installed in a sterilization position on the device, and/or configured to allow sterilization of at least a part of the distilled water before a distribution from the outlet nozzle or aperture, wherein the UV sterilizer is arranged at the water distributor, so that its radiation pattern is axially aligned with at least part of the removable container and/or entering the removable container in correspondence of an aperture thereof, during a distribution through said outlet nozzle or aperture at least part of the removable container being radiated with UV radiation simultaneously with water delivered from the distillation unit, and wherein the mineralization unit comprises a movable extraction element, or a movable puncturing element, selectively displaceable in at least a first configuration wherein it does not interact with the capsule or in a second configuration wherein it does interact with the capsule optionally puncturing it, for extracting the mineralized fluid solution or powder therefrom.

8. The device according to claim 1, wherein the capsule is provided with an auxiliary aperture configured to allow air and/or fluid enter the inner cavity at least during an extraction or emptying of the capsule, and/or is configured to be opened in correspondence of an auxiliary aperture, for allowing an introduction of air and/or fluid at least during the extraction or emptying from the mineralized fluid solution or powder, and wherein the mineralization unit is configured to introduce a fluid, optionally at least water, in particular a part of the distilled water distilled by the distillation unit into the capsule, optionally being configured to introduce into the capsule the fluid, optionally at least water, in particular a part of the distilled water distilled by the distillation unit through said auxiliary aperture or by opening or puncturing the capsule in correspondence of a second position, differing from a first position at which an extraction element or a movable puncturing element is configured to interact with the capsule.

9. The device according to claim 1, wherein the mineralization unit comprises a movable equipment configured to limit the movement of the capsule; the mineralization unit being configured to cause a falling of the capsule in a hopper after the opening of the capsule as a result of a relative motion between the capsule and the movable equipment, the mineralization unit being configured to retain the capsule preventing its falling into the hopper before an opening of the capsule operated through the motion of the movable equipment, wherein the movable equipment is provided with a retaining wall against which the capsule strikes at least at an introduction into the mineralization unit; said retaining wall further defining a housing for at least part of the capsule, and wherein the movable equipment is provided with a tooth configured to engage the capsule, the tooth being configured to favor the distancing of the capsule from a back wall of the mineralization unit and to cause, following the distancing, the falling of the capsule into the hopper.

10. The device according to claim 1, being configured to perform a cyclic distillation and distribution of water, each cycle at least comprising:

loading a predetermined amount of water to be distilled into the distillation unit;

activating the at least one heater for an amount of time sufficient to cause the distillation of at least a part of the water contained into the distillation unit, optionally the whole content of water contained in the distillation unit, activating at least one cooling unit causing the condensation of distillation vapour outside the distillation unit, obtaining a predetermined amount of distilled water, delivering, optionally through a delivering pump, the predetermined amount of distilled water to said water distributor, wherein the predetermined amount of distilled water is mixed with the mineralized fluid solution or powder extracted from the capsule, optionally so that the capsule can be disposed or thrown away, distributing the predetermined amount of distilled water mixed with the mineralized fluid solution or powder to the removable container.

* * * * *